(12) United States Patent
Hu et al.

(10) Patent No.: US 11,373,410 B2
(45) Date of Patent: Jun. 28, 2022

(54) METHOD, APPARATUS, AND STORAGE MEDIUM FOR OBTAINING OBJECT INFORMATION

(71) Applicant: TENCENT TECHNOLOGY (SHENZHEN) COMPANY LIMITED, Shenzhen (CN)

(72) Inventors: Yi Hu, Shenzhen (CN); Ruixin Zhang, Shenzhen (CN)

(73) Assignee: TENCENT TECHNOLOGY (SHENZHEN) COMPNY LIMITED, Shenzhen (CN)

( * ) Notice: Subject to any disclaimer, the term of this patent is extended or adjusted under 35 U.S.C. 154(b) by 0 days.

(21) Appl. No.: 17/005,796

(22) Filed: Aug. 28, 2020

(65) Prior Publication Data

US 2020/0394420 A1 Dec. 17, 2020

Related U.S. Application Data

(63) Continuation of application No. PCT/CN2019/101583, filed on Aug. 20, 2019.

(30) Foreign Application Priority Data

Aug. 29, 2018 (CN) .......................... 201810992443.1

(51) Int. Cl.
*G06K 9/62* (2022.01)
*G06V 20/54* (2022.01)
(Continued)

(52) U.S. Cl.
CPC ........... *G06V 20/54* (2022.01); *G06K 9/6215* (2013.01); *G06V 20/13* (2022.01); *G06V 20/64* (2022.01)

(58) Field of Classification Search
CPC .......... G06K 9/00785; G06K 9/00201; G06K 9/0063; G06K 9/6215; G06K 9/2054;
(Continued)

(56) References Cited

U.S. PATENT DOCUMENTS 9,177,224 B1* 11/2015 Heller .................. G06K 9/4671
2015/0086080 A1* 3/2015 Stein ...................... H04N 7/183
382/104
2018/0225842 A1 8/2018 Wang

FOREIGN PATENT DOCUMENTS

CN 102414719 A 4/2012
CN 106408593 A 2/2017
(Continued)

OTHER PUBLICATIONS

Black J & Ellis T, Multi camera image tracking, (2005), Image and Vision Computing 24: 1256-1267. (Year: 2005).*
(Continued)

*Primary Examiner* — Matthew C Bella
*Assistant Examiner* — Kathleen M Broughton
(74) *Attorney, Agent, or Firm* — Crowell & Moring LLP

(57) ABSTRACT

The present disclosure describes method, apparatus, and storage medium for obtaining object information. The method includes obtaining a to-be-tracked image comprising at least one object and at least one reference image comprising a plurality of objects; extracting a to-be-tracked image block comprising a plurality of to-be-tracked points from the to-be-tracked image and extracting a reference image block comprising a plurality of reference points from a reference image of the at least one reference image; constructing a point transformation relationship between the to-be-tracked image block and the reference image block based on a position relationship between the plurality of to-be-tracked points and a position relationship between the plurality of reference points; and obtaining a position of a
(Continued)

reference point in the reference image corresponding to a to-be-tracked point based on the point transformation relationship, to determine an object in the reference image corresponding to the at least one object.

14 Claims, 15 Drawing Sheets

(51) Int. Cl.
  *G06V 20/13* (2022.01)
  *G06V 20/64* (2022.01)
(58) Field of Classification Search
  CPC .............. G06K 9/3275; G06K 9/00791; G06K 2009/363; G06K 2009/15; H04W 4/029; H04W 4/40
  See application file for complete search history.

(56) References Cited

FOREIGN PATENT DOCUMENTS

| CN | 106920252 | A | | 7/2017 | |
|---|---|---|---|---|---|
| CN | 107600067 | A | | 1/2018 | |
| CN | 109165606 | A | | 1/2019 | |
| EP | 3176052 | A1 | | 7/2017 | |
| FR | 3020490 | A1 | * | 10/2015 | ............ G06K 9/3241 |
| WO | WO-2017095576 | A1 | * | 6/2017 | ............. G06T 7/149 |

OTHER PUBLICATIONS

Yue et al., Robust Two-camera Tracking Using Homography, (2004), IEEE ICASSP III: 1-4. (Year: 2004).*
European Search Report regarding EP 19 853 604.7 dated Apr. 12, 2021, 8 pages.
Black et al. "Multi camera image tracking," Image and Vision Computing. Elsevier, Guildford, GB, vol. 24, No. 11, Nov. 1, 2006, 12 pgs.
Dai et al., "Geometry-Based Object Association and Consistent Labeling in Multi-Camera Surveillance," Journal on Emerging and Selected Topics in Circuits and Systems, IEEE, Piscataway, NJ, vol. 3, No. 2, Jun. 1, 2013, 10 pgs.
Buch et al., "A Review of Computer Vision Techniques for the Analysis of Urban Traffic," IEEE Transactions on Intelligent Transportation Systems, IEEE, Piscataway, NJ, vol. 12, No. 3, Sep. 1, 2011, 20 pgs.
Chao-Yung Hsu et al., "Cross Camera Vehicle Tracking Via Affine Invariant Object Matching For Video Forensics Applications," 2013 IEEE International Conference on Multimedia and Expo, Yunlin, Taiwan, Jul. 15, 2013, 6 pgs.
Palazzi et al., "Learning to Map Vehicles into Bird's Eye View," Cornell University Library, Ithaca, NY, Jun. 26, 2017, 11 pgs.
International Search Report with English translation and Written Opinion regarding PCT/CN2019/101583 dated Nov. 18, 2019, 10 pages.
Office Action with concise translation regarding 201810992443.1 dated Jul. 29, 2019.
Office Action with concise translation regarding 201810992443.1 dated Sep. 26, 2019.
European Office Action regarding EP Appl. No. 19 853 604.7 dated Feb. 22, 2022, 9 pages.

* cited by examiner

METHOD, APPARATUS, AND STORAGE MEDIUM FOR OBTAINING OBJECT INFORMATION

RELATED APPLICATION

This application is a continuation application of PCT Patent Application No. PCT/CN2019/101583, filed on Aug. 20, 2019, which claims priority to Chinese Patent Application No. 201810992443.1, filed with the China National Intellectual Property Administration on Aug. 29, 2018, both of which are incorporated herein by reference in their entireties.

FIELD OF THE TECHNOLOGY

This application relates to the field of image processing technologies, and specifically, to method, apparatus, and storage medium for obtaining object information.

BACKGROUND OF THE DISCLOSURE

In recent years, with the development of economy and technology, the quantity of vehicles also greatly increases. Meanwhile, the quantity of different types of regulation or law violation cases related to vehicles also increases year by year. Accurate vehicle monitoring based on real-name vehicle registration helps solve cases and safeguard public security.

Currently, vehicles are generally monitored by using a multi-target tracking system. The system includes a box camera and a plurality of dome cameras. For example, a single dome camera is responsible for monitoring vehicles in a specific area, and the box camera is responsible for splicing pictures photographed by all the dome cameras, to implement vehicle monitoring.

SUMMARY

Embodiments of this application provide an object information obtaining method and apparatus, and a storage medium.

The present disclosure describes embodiments of a method for obtaining object information. The method includes obtaining, by a device, a to-be-tracked image and at least one reference image, the to-be-tracked image comprising at least one object, and the at least one reference image comprising a plurality of objects. The device includes a memory storing instructions and a processor in communication with the memory. The method also includes extracting, by the device, a to-be-tracked image block from the to-be-tracked image and extracting a reference image block from a reference image of the at least one reference image, the to-be-tracked image block comprising a plurality of to-be-tracked points used for marking object information in the to-be-tracked image, and the reference image block comprising a plurality of reference points used for marking object information in the reference image; constructing, by the device, a point transformation relationship between the to-be-tracked image block and the reference image block based on a position relationship between the plurality of to-be-tracked points and a position relationship between the plurality of reference points; and obtaining, by the device, a position of a reference point in the reference image corresponding to a to-be-tracked point in the to-be-tracked image based on the point transformation relationship, to determine an object in the reference image corresponding to the at least one object.

The present disclosure describes embodiments of an apparatus for obtaining object information. The apparatus includes a memory storing instructions; and a processor in communication with the memory. When the processor executes the instructions, the processor is configured to cause the apparatus to: obtain a to-be-tracked image and at least one reference image, the to-be-tracked image comprising at least one object, and the at least one reference image comprising a plurality of objects, extract a to-be-tracked image block from the to-be-tracked image and extract a reference image block from a reference image of the at least one reference image, the to-be-tracked image block comprising a plurality of to-be-tracked points used for marking object information in the to-be-tracked image, and the reference image block comprising a plurality of reference points used for marking object information in the reference image, construct a point transformation relationship between the to-be-tracked image block and the reference image block based on a position relationship between the plurality of to-be-tracked points and a position relationship between the plurality of reference points, and obtain a position of a reference point in the reference image corresponding to a to-be-tracked point in the to-be-tracked image based on the point transformation relationship, to determine an object in the reference image corresponding to the at least one object.

The present disclosure describes embodiments of a non-transitory computer readable storage medium storing computer readable instructions. The computer readable instructions, when executed by a processor, are configured to cause the processor to perform: obtaining a to-be-tracked image and at least one reference image, the to-be-tracked image comprising at least one object, and the at least one reference image comprising a plurality of objects; extracting a to-be-tracked image block from the to-be-tracked image and extracting a reference image block from a reference image of the at least one reference image, the to-be-tracked image block comprising a plurality of to-be-tracked points used for marking object information in the to-be-tracked image, and the reference image block comprising a plurality of reference points used for marking object information in the reference image; constructing a point transformation relationship between the to-be-tracked image block and the reference image block based on a position relationship between the plurality of to-be-tracked points and a position relationship between the plurality of reference points; and obtaining a position of a reference point in the reference image corresponding to a to-be-tracked point in the to-be-tracked image based on the point transformation relationship, to determine an object in the reference image corresponding to the at least one object.

The embodiments of the present disclosure also provide an object tracking method, performed by a computing device, the method including:

obtaining a to-be-tracked image including at least one object and at least one reference image including a plurality of objects;

extracting a to-be-tracked image block from the to-be-tracked image, and extracting a reference image block from the reference image, the to-be-tracked image block including a plurality of to-be-tracked position points used for marking object position information in the to-be-tracked image, and the reference image block including a plurality of reference position points used for marking object position information in the reference image;

constructing a position point transformation relationship between the to-be-tracked image block and the reference image block based on a position relationship between the plurality of to-be-tracked position points and a position relationship between the plurality of reference position points; and obtaining a position of a corresponding reference position point of a to-be-tracked position point in the to-be-tracked image in the reference image based on the position point transformation relationship, to determine an object corresponding to the at least one object in the reference image.

Correspondingly, the embodiments of the present disclosure further provide an object information obtaining apparatus, including:

an image obtaining unit, configured to obtain a to-be-tracked image including at least one object and at least one reference image including a plurality of objects;

an extraction unit, configured to: extract a to-be-tracked image block from the to-be-tracked image, and extract a reference image block from the reference image, the to-be-tracked image block including a plurality of to-be-tracked position points used for marking object position information in the to-be-tracked image, and the reference image block including a plurality of reference position points used for marking object position information in the reference image;

a position point transformation relationship construction unit, configured to construct a position point transformation relationship between the to-be-tracked image block and the reference image block based on a position relationship between the plurality of to-be-tracked position points and a position relationship between the plurality of reference position points; and a position obtaining unit, configured to obtain a position of a corresponding reference position point of a to-be-tracked position point in the to-be-tracked image in the reference image based on the position point transformation relationship, to determine an object corresponding to the at least one object in the reference image.

The embodiments of the present disclosure further provide a non-transitory computer readable storage medium, storing a plurality of instructions, the instructions being suitable for being loaded by a processor, to perform the operations of the above methods.

In addition, the embodiments of this application provide a computing device, including a processor and a memory, the memory storing a computer program, the computer program being suitable for being loaded by the processor to perform the operations of the object information obtaining method.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1A:
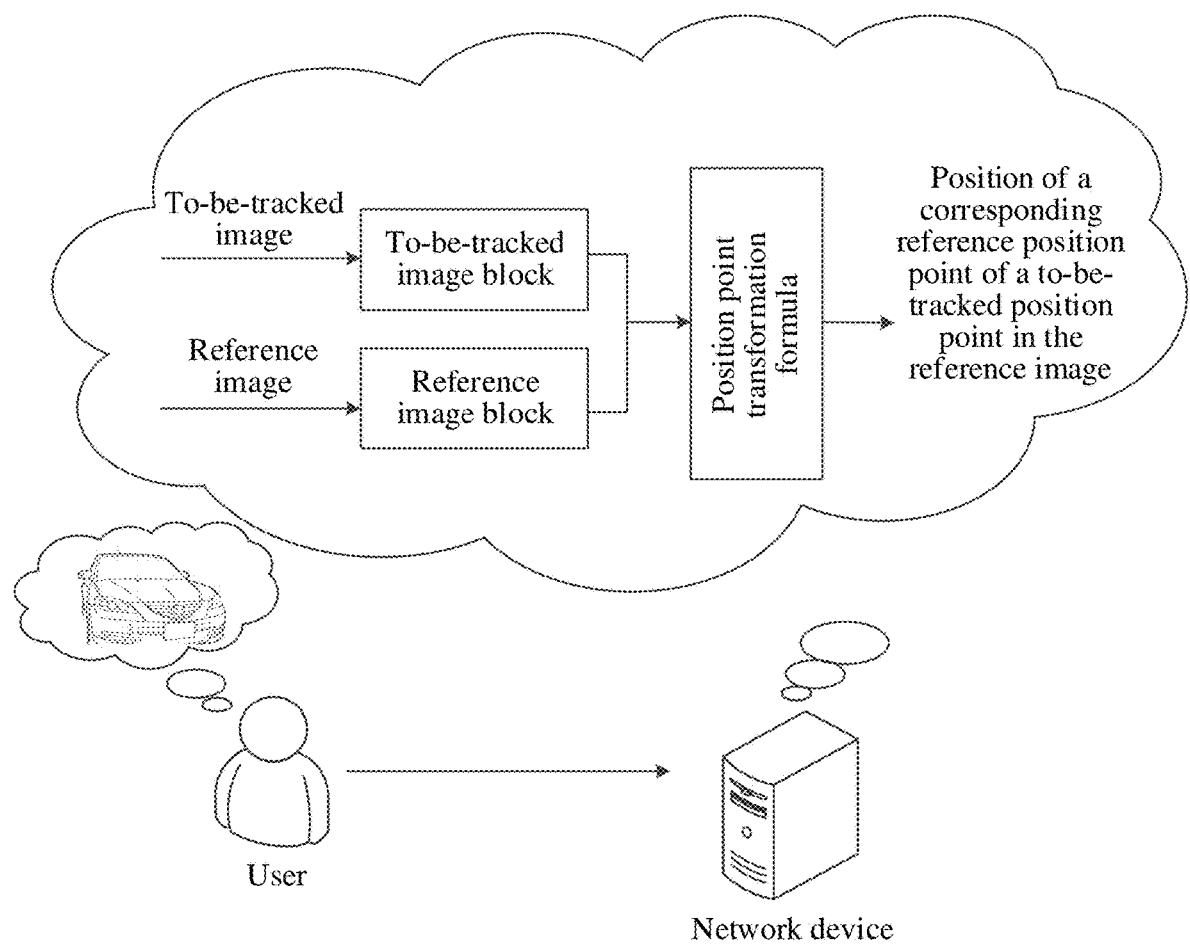
FIG. 1A is a schematic scenario diagram of an object information obtaining method according to an embodiment of this application.

The technical solutions in the embodiments of this application are clearly described in the following with reference to the accompanying drawings. Apparently, the embodiments to be described are merely some embodiments of this application rather than all of the embodiments. All other embodiments obtained by a person skilled in the art based on the embodiments of this application without creative efforts shall fall within the protection scope of this application.

The terms such as "first" and "second" in the specification, claims, and accompanying drawings of this application are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The embodiments of this application provide an object information obtaining method and apparatus, and a storage medium.

The object information obtaining apparatus may be specifically integrated into a network device, for example, a computing device such as a terminal or a server.

For example, referring to FIG. 1A, when a user needs to obtain object information, an image (that is, a to-be-tracked image) including at least one object may be provided to the network device. Meanwhile, the network device may obtain at least one reference image including a plurality of objects. Then, a to-be-tracked image block is extracted from the to-be-tracked image, and a reference image block is extracted from the reference image. Next, a position point transformation relationship (or a point transformation relationship) between the to-be-tracked image block and the reference image block is constructed based on a position relationship between a plurality of to-be-tracked position points (or to-be-tracked points) and a position relationship between a plurality of reference position points (or reference points). Then, a position of a corresponding reference position point of a to-be-tracked position point in the to-be-tracked image in the reference image is obtained based on the point transformation relationship, to determine an object corresponding to the at least one object in the reference image. The object may be a vehicle or another traffic tool.

Detailed descriptions are separately made below. A sequence of the following embodiments is not intended to imply a preferred sequence of the embodiments.

An object information obtaining method is provided, including: obtaining a to-be-tracked image including at least one object and at least one reference image including a plurality of objects; extracting a to-be-tracked image block from the to-be-tracked image, and extracting a reference image block from the reference image; constructing a point transformation relationship between the to-be-tracked image block and the reference image block based on a position relationship between the plurality of to-be-tracked position points and a position relationship between the plurality of reference position points; and obtaining a position of a corresponding reference position point of a to-be-tracked position point in the to-be-tracked image in the reference image based on the point transformation relationship, to determine an object corresponding to the at least one object in the reference image.

Figure 1B:
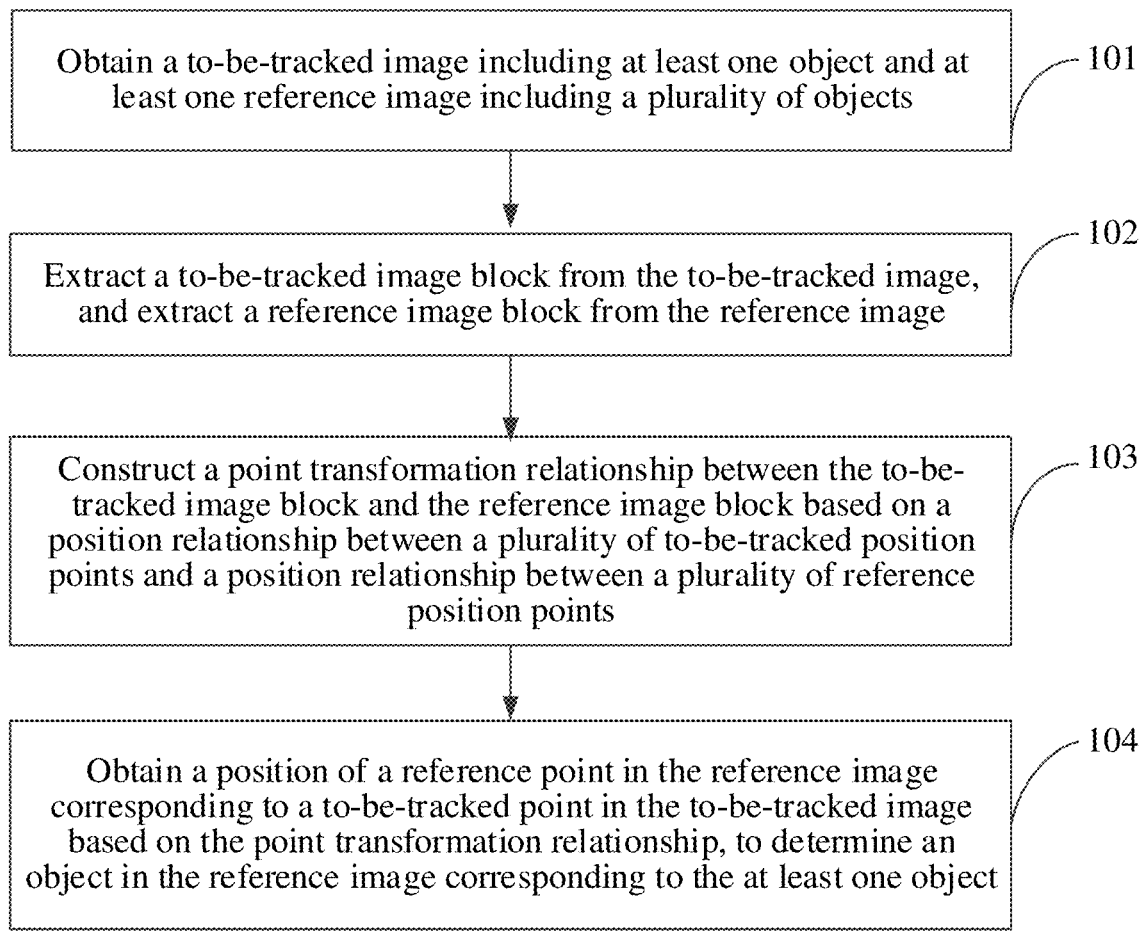
FIG. 1B is a schematic flowchart of an object information obtaining method according to an embodiment of this application.

FIG. 1B is a schematic flowchart of an object information obtaining method according to an embodiment of this application. A specific procedure of the object information obtaining method may include the following steps:

Step 101. Obtain a to-be-tracked image including at least one object and at least one reference image including a plurality of objects. In one implementation, the object may be a vehicle.

In this embodiment of this application, the to-be-tracked image refers to an image including at least one vehicle, generally including a plurality of vehicles. The to-be-tracked image may include complete images of the plurality of vehicles or partial images of the plurality of vehicles, or may include complete images of some of the vehicles and partial images of the other vehicles. A specific case is determined according to an actual situation. The reference image refers to an image corresponding to the same viewing area as the to-be-tracked image at the same time but at a different viewing angle. For example, the to-be-tracked image is obtained by photographing an intersection from one angle by a camera 500 meters above the ground, and the reference image is obtained by photographing the intersection from another angle by a camera 1000 meters above the ground. In addition, the to-be-tracked image and the reference image are photographed at the same time.

There may be a plurality of manners for obtaining a to-be-tracked image including at least one vehicle and at least one reference image including a plurality of vehicles. For example, a specific manner may be receiving, by using a computing device, a vehicle information obtaining request triggered by a user. For example, the user inputs a vehicle identifier to the computing device. The vehicle information obtaining request includes the vehicle identifier. The vehicle identifier is, for example, a license plate number or an annual inspection label adhered to vehicle window glass. Then, the computing device obtains a to-be-tracked image according to the vehicle information obtaining request. The to-be-tracked image includes a vehicle specified in the vehicle information obtaining request. For example, the computing device performs image recognition on images and video pictures in an image library according to the vehicle identifier included in the vehicle information obtaining request, to obtain an image including the vehicle identifier, and uses the image as a to-be-tracked image. Then, the computing device obtains, according to the to-be-tracked image, at least one reference image including a plurality of vehicles.

There may be a plurality methods for obtaining, according to the to-be-tracked image, at least one reference image including a plurality of vehicles. For example, at least one reference image including a plurality of vehicles may be obtained according to time information of the to-be-tracked image.

Specifically, in some embodiments, the obtaining at least one reference image including a plurality of vehicles includes:

(11) obtaining time information of the to-be-tracked image; and

(12) obtaining, based on the time information, at least one reference image including a plurality of vehicles.

The to-be-tracked image and the reference image may be specifically clipped from a surveillance footage, extracted from an image library, or the like.

Step 102. Extract a to-be-tracked image block from the to-be-tracked image, and extract a reference image block from the reference image.

The to-be-tracked image block includes a plurality of to-be-tracked position points used for marking vehicle position information in the to-be-tracked image, and the reference image block includes a plurality of reference position points used for marking vehicle position information in the reference image. For example, specifically, the computing device may obtain information about the to-be-tracked position points in the to-be-tracked image, such as a quantity of the to-be-tracked position points and positions of the to-be-tracked position points in the to-be-tracked image. Then, the computing device clips, according to the to-be-tracked position points, an area encircled by the to-be-tracked position points, to obtain the to-be-tracked image block. Similarly, a reference image block of a preset area is extracted from the reference image in the same way. Details are not described herein again.

In some embodiments, a specific manner of extracting a to-be-tracked image block of a first preset area from the to-be-tracked image, and extracting a reference image block of a second preset area corresponding to the first preset area from the reference image may include:

(21) obtaining preset coordinate points;

(22) determining first position information of the preset coordinate points in the to-be-tracked image according to the preset coordinate points, and cropping the to-be-tracked image according to the first position information to obtain an image block of the first preset area in which the preset coordinate points are located as the to-be-tracked image block; and

(23) determining second position information of the preset coordinate points in the reference image according to the preset coordinate points, and cropping the reference image according to the second position information to obtain an image block of the second preset area in which the preset coordinate points are located as the reference image block.

The to-be-tracked position points in the to-be-tracked image and/or the reference position points in the reference image may be preset, which may be determined by a specific manner according to an actual application requirement.

The first preset area in the to-be-tracked image and the second preset area in the reference image are the same area in an actual scenario. A perspective transformation relationship exists between the first preset area and the second preset area. That is, the to-be-tracked image block and the reference image block are images corresponding to the same area but at different viewing angles, and maintain geometric shapes of items and a relative position relationship between the items in the area.

Step 103. Construct a position point transformation relationship (or a point transformation relationship) between the to-be-tracked image block and the reference image block based on a position relationship between the plurality of to-be-tracked position points (or to-be-tracked points) and a position relationship between the plurality of reference position points (or reference points).

For example, there are five to-be-tracked position points and five reference position points. Each of the to-be-tracked position points and the reference position points is represented by a two-dimensional vector (x, y). Then, Euclidean distances between each to-be-tracked position point and all the reference position points are calculated. Next, a distance matrix between the to-be-tracked position point and the reference position points is constructed according to the Euclidean distances. That is, a point transformation relationship is constructed. The point transformation relationship is specifically a position point transformation formula.

In another example, alternatively, the plurality of to-be-tracked position points may be mapped to the reference image according to a preset coordinate axis transformation formula, to obtain a plurality of mapped position points. Then, a point transformation relationship between the plurality of mapped position points and the plurality of reference position points is constructed.

Specifically, in some embodiments, the step of constructing a point transformation relationship between the plurality of mapped position points and the plurality of reference position points may specifically include:

(31) mapping the plurality of to-be-tracked position points to the reference image according to the preset coordinate axis transformation formula, to obtain the plurality of mapped position points; and

(32) constructing the point transformation relationship between the plurality of mapped position points and the plurality of reference position points.

Specifically, the point transformation relationship between the plurality of mapped position points and the plurality of reference position points may be constructed by calculating matching degrees between the mapped position points and the reference position points, to construct the point transformation relationship between the to-be-tracked image block and the reference image block.

Specifically, in some embodiments, the step of constructing a point transformation relationship between the plurality of mapped position points and the plurality of reference position points may specifically include:

(41) determining a mapped position point that needs to be processed currently, to obtain a currently processed mapped position point;

(42) calculating matching degrees between the currently processed mapped position point and the plurality of reference position points, to obtain a matching degree set;

(43) returning to the operation of determining a mapped position point that needs to be processed currently until matching degrees between each mapped position point and the plurality of reference position points are calculated; and

(44) constructing a point transformation relationship between the to-be-tracked position points and the reference position points according to the matching degree set.

The coordinate axis transformation formula may be established in advance. Specifically, before the step of extracting a to-be-tracked image block of a preset area from the to-be-tracked image, and extracting a reference image block of a preset area from the reference image, the method may specifically further include:

(51) marking corresponding coordinate points in each of the to-be-tracked image and the reference image; and

(52) constructing the coordinate axis transformation formula between the to-be-tracked image and the reference image according to a correspondence between the coordinate points of the to-be-tracked image and the coordinate points of the reference image.

For example, specifically, coordinate points may be marked in each of the to-be-tracked image and the reference image, and each of the coordinate points may be represented by a two-dimensional vector (x, y). Then, a transformation matrix, that is, the coordinate axis transformation formula, of the coordinate points is constructed based on a principle of perspective transformation.

The perspective transformation is a projection transformation of a central projection, and is a linear fractional transformation of a plane when expressed in non-homogeneous projective coordinates. The projection transformation refers to a process of transforming a three-dimensional item or object in a space coordinate system into a two-dimensional image. According to different distances between a viewpoint (a projection center) and the projection plane, the projection may be classified into a parallel projection and a perspective projection. The perspective projection is the perspective transformation. The distance between a viewpoint (a projection center) of the parallel projection and the projection plane is infinite, but for the perspective projection (transformation), the distance is finite. The perspective projection has a characteristic of a perspective reduction effect. That is, a size of a perspective projection of a three-dimensional item or object is inversely proportional to a distance from a body to the viewpoint (the projection center). For example, for two straight line segments of an equal length that are both parallel to the projection plane, the line segment close to the projection center has a large perspective projection, and the line segment far from the projection center has a small perspective projection. A visual effect generated by the effect is similar to that of a human visual system. Compared with the parallel projection, the perspective projection has a stronger depth perception and looks more realistic, but the perspective projection does not really reflect an exact size or shape of an item.

Step 104. Obtain a position of a reference point in the reference image corresponding to a to-be-tracked point in the to-be-tracked image based on the point transformation relationship, to determine an object in the reference image corresponding to the at least one object.

For example, specifically, the position of the corresponding reference position point of the to-be-tracked position point in the to-be-tracked image in the reference image may be determined based on the point transformation relationship. Then, vehicle information of a vehicle corresponding to the to-be-tracked position point may be obtained according to the position of the corresponding reference position point of the to-be-tracked position point in the reference image, and then, a motion track of the vehicle in the reference image is obtained according to the vehicle information such as a vehicle image, a vehicle identifier, and a position in the reference image.

Specifically, in some embodiments, after the step of obtaining a position of a corresponding reference position point of a to-be-tracked position point in the to-be-tracked image in the reference image based on the point transformation relationship, the method may specifically further include:

(61) obtaining, according to the position of the corresponding reference position point of the to-be-tracked position point in the to-be-tracked image in the reference image, the vehicle information of the vehicle corresponding to the to-be-tracked position point;

(62) determining the position of the vehicle in the reference image according to the vehicle information; and

(63) obtaining the motion track of the vehicle in the reference image according to the position of the vehicle in the reference image.

In this embodiment of this application, after a to-be-tracked image including at least one vehicle and at least one reference image including a plurality of vehicles are obtained, a to-be-tracked image block is extracted from the to-be-tracked image, and a reference image block is extracted from the reference image. Then, a point transformation relationship between the to-be-tracked image block and the reference image block is constructed based on a position relationship between a plurality of to-be-tracked position points and a position relationship between a plurality of reference position points. Next, a position of a corresponding reference position point of a to-be-tracked position point in the to-be-tracked image in the reference image is obtained based on the point transformation relationship, to determine a vehicle corresponding to the at least one vehicle in the reference image. Compared with the existing solution that a vehicle is tracked by using a spliced picture, this application can avoid a problem caused by a missing, blurred, or indiscernible vehicle image. Therefore, the effectiveness and accuracy of recognition can be improved.

The method according to the embodiments is further described below in detail by using examples.

In this embodiment, a description is made by using an example in which the object information obtaining apparatus is specifically integrated into a terminal.

Figure 2A:
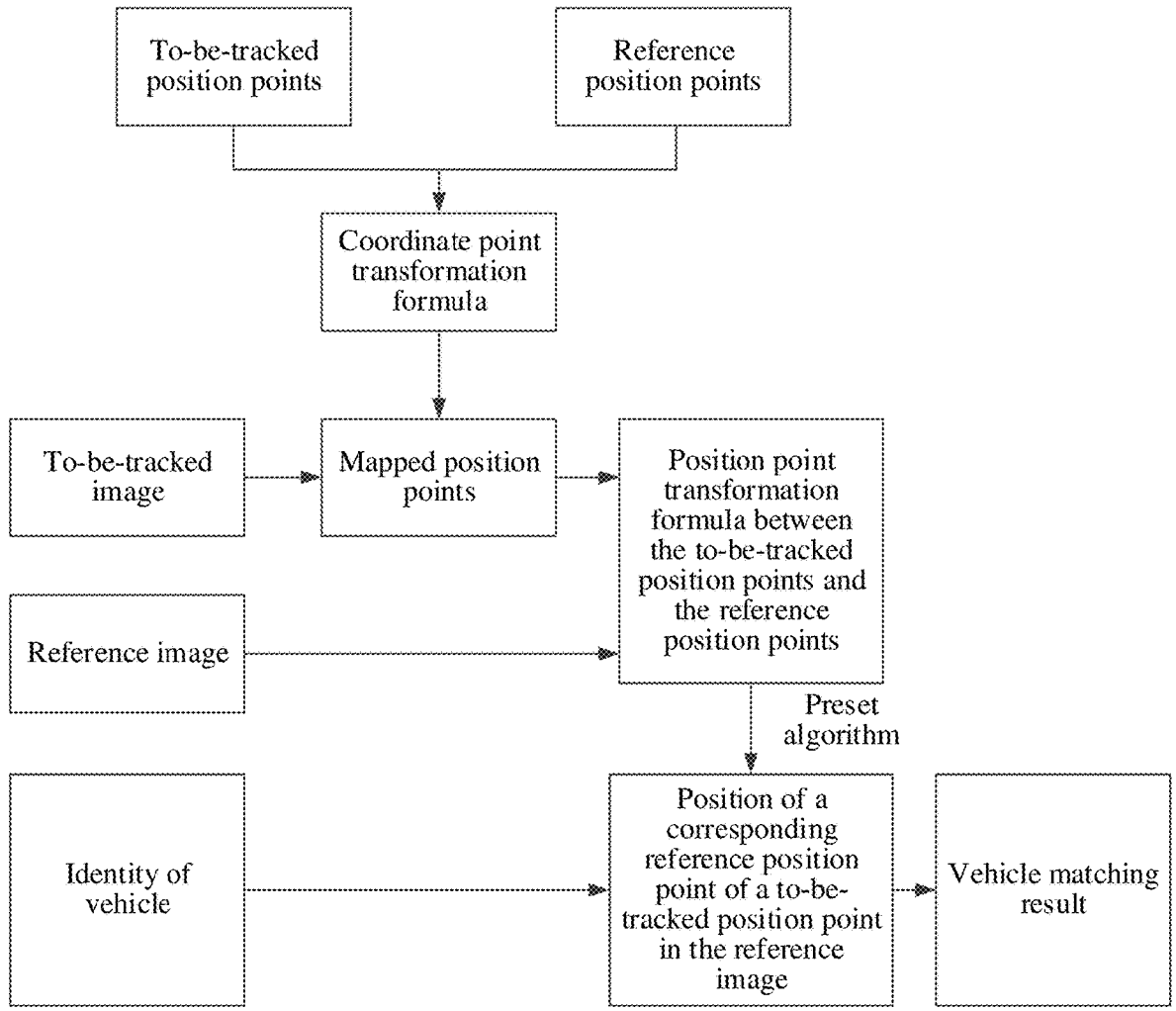
FIG. 2A is a schematic application diagram of an object information obtaining method according to an embodiment of this application.

For example, referring to FIG. 2A, when a user needs to obtain vehicle information of a specific vehicle, the terminal may first obtain an image (that is, a to-be-tracked image) including at least one vehicle and at least one reference image including a plurality of vehicles. Then, the terminal extracts a to-be-tracked image block from the to-be-tracked image, and extracts a reference image block from the reference image. A plurality of to-be-tracked position points used for marking vehicle position information in the to-be-tracked image are set on the to-be-tracked image block, and a plurality of reference position points used for marking vehicle position information in the reference image are set on the reference image block.

Next, the terminal may map the plurality of to-be-tracked position points to the reference image according to a preset coordinate axis transformation formula, to obtain a plurality of mapped position points. The coordinate axis transformation formula may be constructed in advance by the terminal according to the to-be-tracked position points and the reference position points. Then, the terminal may construct a transformation formula between the to-be-tracked position points and the reference position points based on the plurality of mapped position points, and may process the formula by using a preset algorithm, to obtain reference position points corresponding to the to-be-tracked position points in the reference image. In this way, the terminal may provide vehicle information, such as a running path, of the corresponding vehicle, while the user only needs to input an identifier of the specific vehicle such as a license plate number or an annual inspection label adhered to vehicle window glass.

Figure 2B:
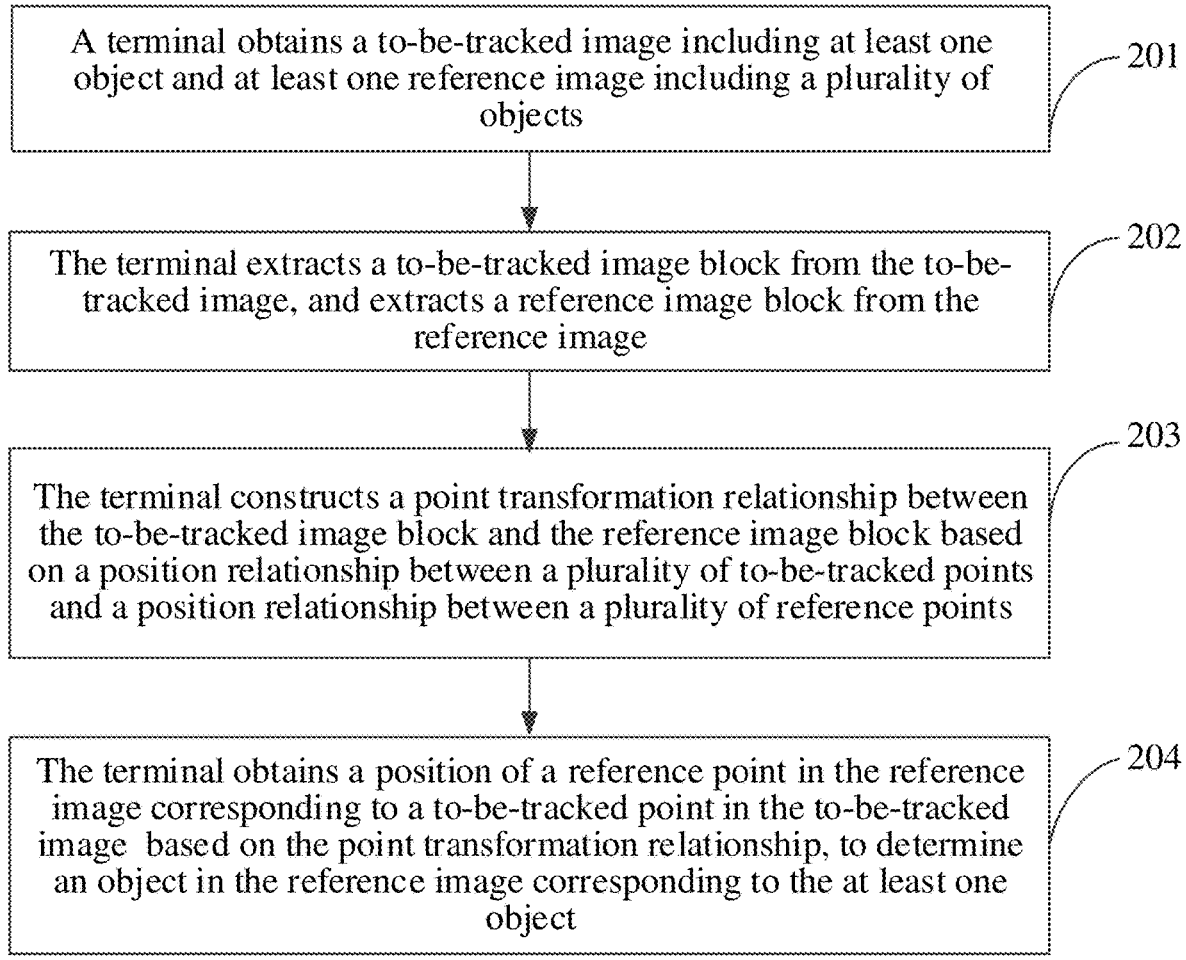
FIG. 2B is another schematic flowchart of an object information obtaining method according to an embodiment of this application.

FIG. 2B is another schematic flowchart of an object information obtaining method according to an embodiment of this application. Referring to FIG. 2B, a specific procedure of the object information obtaining method may include the following steps:

Step 201. A terminal obtains a to-be-tracked image including at least one object and at least one reference image including a plurality of objects. The object is a vehicle.

There may be a plurality of manners for obtaining a to-be-tracked image including at least one vehicle and at least one reference image including a plurality of vehicles. For example, the terminal may specifically receive a vehicle information obtaining request triggered by the user. For example, the user inputs a vehicle identifier to the terminal. The vehicle information obtaining request includes the vehicle identifier. The vehicle identifier is, for example, a license plate number or an annual inspection label adhered to vehicle window glass. Then, the terminal obtains a to-be-tracked image according to the vehicle information obtaining request. The to-be-tracked image includes a vehicle specified in the vehicle information obtaining request. For example, the terminal performs image recognition on images and video pictures in an image library according to the vehicle identifier included in the vehicle information obtaining request, to obtain an image including the vehicle identifier, and uses the image as a to-be-tracked image. Next, the terminal obtains, according to the to-be-tracked image, at least one reference image including a plurality of vehicles.

There may be a plurality methods for obtaining, by the terminal according to the to-be-tracked image, at least one reference image including a plurality of vehicles. For example, the terminal may obtain, according to time information of the to-be-tracked image, at least one reference image including a plurality of vehicles.

Specifically, in some embodiments, the obtaining, by the terminal, at least one reference image including a plurality of vehicles includes:

(11) obtaining, by the terminal, time information of the to-be-tracked image; and

(12) obtaining, by the terminal based on the time information, at least one reference image including a plurality of vehicles.

The to-be-tracked image and the reference image may be specifically clipped from a surveillance footage, extracted from an image library, or the like.

Step 202. The terminal extracts a to-be-tracked image block from the to-be-tracked image, and extracts a reference image block from the reference image.

The to-be-tracked image block includes a plurality of to-be-tracked position points used for marking vehicle position information in the to-be-tracked image, and the reference image block includes a plurality of reference position points used for marking vehicle position information in the reference image. For example, the terminal may specifically obtain information about the to-be-tracked position points in the to-be-tracked image, such as a quantity of the to-be-tracked position points and positions of the to-be-tracked position points in the to-be-tracked image. Then, the terminal clips, according to the to-be-tracked position points, an area encircled by the to-be-tracked position points, to obtain the to-be-tracked image block. Similarly, the terminal extracts a reference image block of a preset area from the reference image in the same way. Details are not described herein again.

In some embodiments, a specific manner of extracting, by the terminal, a to-be-tracked image block of a first preset area from the to-be-tracked image, and extracting a reference image block of a second preset area corresponding to the first preset area from the reference image may be as follows:

(21) The terminal obtains preset coordinate points. Step (21) may specifically include: obtaining preset coordinate points in the to-be-tracked image and preset coordinate points in the reference image according to an input of the user. For example, the terminal obtains the preset coordinate points in the to-be-tracked image by detecting a click/tap operation performed by the user in the to-be-tracked image displayed on a display screen of the terminal through a mouse or the like. Similarly, the terminal obtains the preset coordinate points in the reference image.

(22) The terminal determines first position information of the preset coordinate points in the to-be-tracked image according to the preset coordinate points, and clips, from the to-be-tracked image according to the first position information, an image block of the first preset area in which the preset coordinate points are located, to obtain the to-be-tracked image block. Step (22) may specifically include: determining the first position information of the preset coordinate points in the to-be-tracked image according to the preset coordinate points in the to-be-tracked image, obtaining, from the to-be-tracked image according to the first position information, the first preset area in which the preset coordinate points are located, and then clipping an image block from the first preset area, to obtain the to-be-tracked image block.

(23) The terminal determines second position information of the preset coordinate points in the reference image according to the preset coordinate points, and clips, from the reference image according to the second position information, an image block of the area in which the preset coordinate points are located, to obtain the reference image block. Step (23) may specifically include: determining the second position information of the preset coordinate points in the reference image according to the preset coordinate points in the reference image, obtaining, from the reference image according to the second position information, a second preset area in which the preset coordinate points are located, and then clipping an image block from the second preset area, to obtain the reference image block.

The to-be-tracked position points in the to-be-tracked image and the reference position points in the reference image may be preset. A specific manner is determined according to an actual application requirement.

The first preset area in the to-be-tracked image and the second preset area in the reference image are the same area in an actual scenario. A perspective transformation relationship exists between the first preset area and the second preset area. That is, the to-be-tracked image block and the reference image block are images corresponding to the same area but at different viewing angles, and maintain geometric shapes of items and a relative position relationship between the items in the area.

Figure 2C:
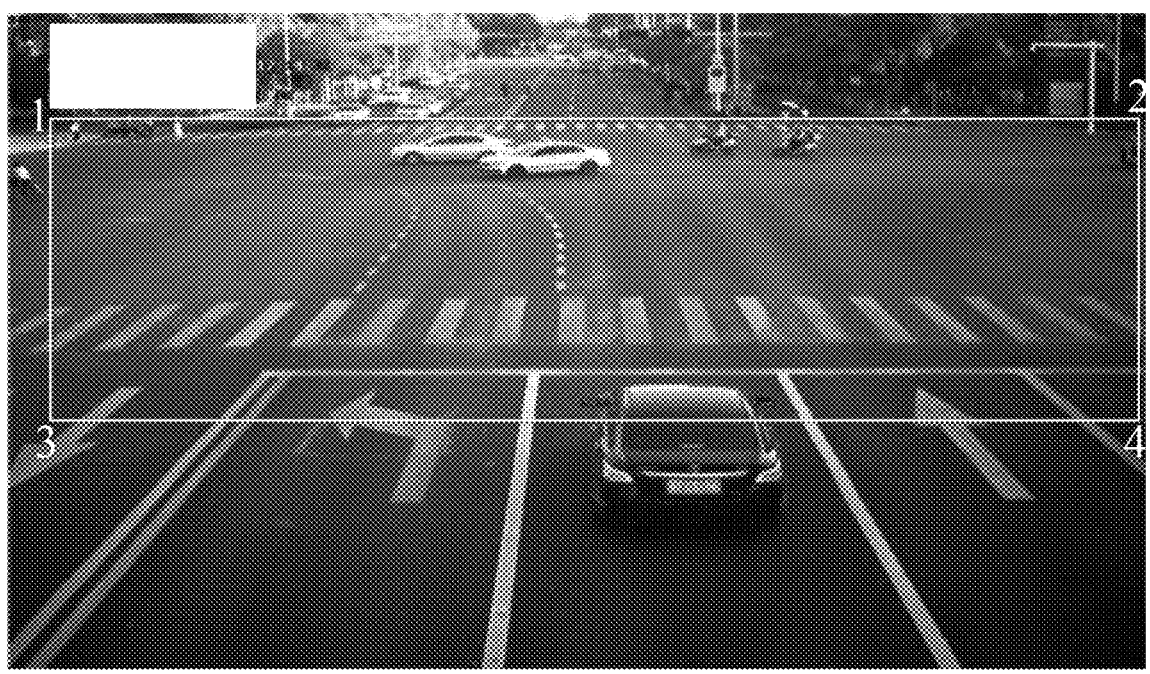
FIG. 2C is a first example diagram of an obtained to-be-tracked image in an object information obtaining method according to an embodiment of this application.
Figure 2D:
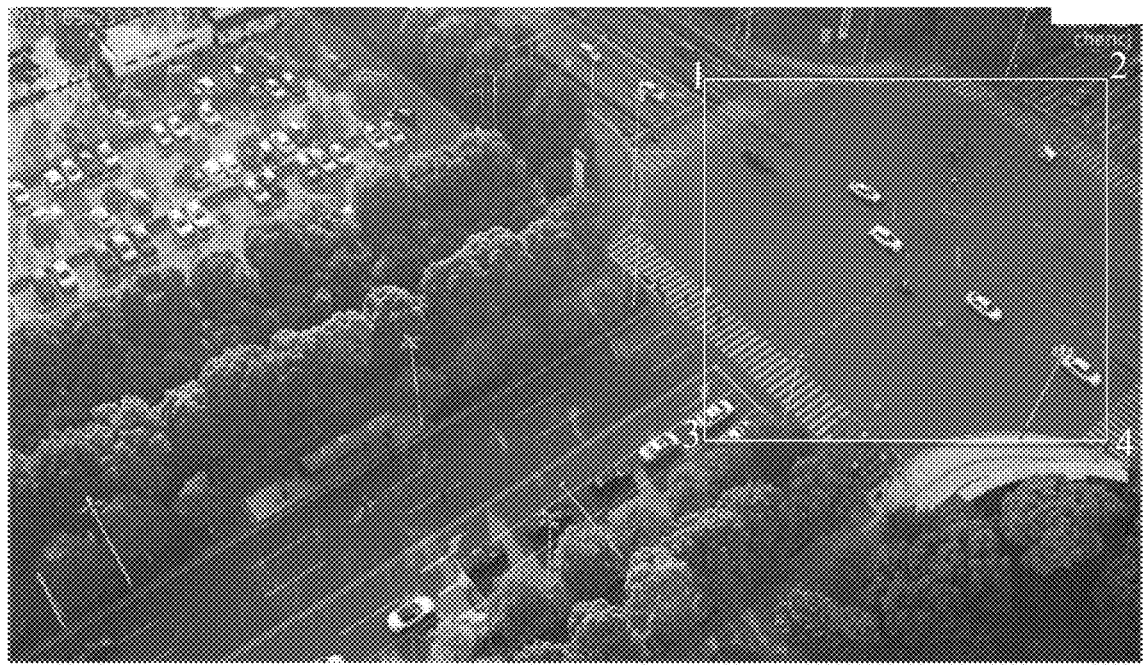
FIG. 2D is a first example diagram of an obtained reference image in an object information obtaining method according to an embodiment of this application.

For example, FIG. 2C is a first example diagram of an obtained to-be-tracked image in the vehicle information obtaining method according to an embodiment of this application. FIG. 2D is a first example diagram of an obtained reference image in the vehicle information obtaining method according to an embodiment of this application. Referring to FIG. 2C and FIG. 2D, four preset coordinate points are obtained by the terminal. That is, there are four to-be-tracked position points in the to-be-tracked image. As shown in FIG. 2C, 1, 2, 3, and 4 in FIG. 2C are to-be-tracked position points. There are four reference position points in the reference image. As shown in FIG. 2D, 1, 2, 3, and 4 are reference position points. Then, the terminal may determine first position information of the four preset coordinate points in the to-be-tracked image according to the four preset coordinate points. The first position information may include positions of the to-be-tracked position points in the to-be-tracked image, the quantity of the to-be-tracked position points, and distances between the to-be-tracked position points. Then, the terminal clips, from the to-be-tracked image according to the first position information, an image block of an area in which the four preset coordinate points are located, to obtain a to-be-tracked image block. Similarly, the terminal may also determine second position information of the four preset coordinate points in the reference image according to the four preset coordinate points in the reference image, and clip a reference image according to the second position information, to obtain a reference image block.

The image block encircled by the plurality of mark points in the to-be-tracked image and the image block encircled by the plurality of mark points in the reference image are the same area in an actual scenario.

In addition, in some other embodiments, to-be-tracked position points may mark a vehicle in the to-be-tracked image. That is, an image of each vehicle corresponds to to-be-tracked position points. Then, the terminal may clip all vehicles in the to-be-tracked images according to the to-be-tracked position points, to obtain a plurality of to-be-tracked image blocks. For a method for clipping a to-be-tracked image block, refer to the foregoing embodiments. Similarly, the reference image is processed in the same way. Details are not described herein again.

Step 203. The terminal constructs a point transformation relationship between the to-be-tracked image block and the reference image block based on a position relationship between the plurality of to-be-tracked points and a position relationship between the plurality of reference points. In one implementation, the to-be-tracked points may be to-be-tracked position points, and the reference points may be reference position points.

For example, still referring to FIG. 2C and FIG. 2D, there being four to-be-tracked position points in the to-be-tracked image and four reference position points in the reference image is still used as an example. Each of the to-be-tracked position points and the reference position points is represented by a two-dimensional vector (x, y). Then, the terminal may calculate Euclidean distances between each to-be-tracked position point and all the reference position points, to obtain a distance set. For example, Euclidean distances between a point 1 in the to-be-tracked image in FIG. 2C and all reference position points 1 to 4 in the reference image in FIG. 2D are calculated, to obtain a first distance set. Then, Euclidean distances between a point 2 in the to-be-tracked image in FIG. 2C and all the reference position points 1 to 4 in the reference image in FIG. 2D are calculated, to obtain a second distance set. Euclidean distances between a point 3 in the to-be-tracked image in FIG. 2C and all the reference position points 1 to 4 in the reference image in FIG. 2D are calculated, to obtain a third distance set. Euclidean distances between a point 4 in the to-be-tracked image in FIG. 2C and all the reference position points 1 to 4 in the reference image in FIG. 2D are calculated, to obtain a fourth distance set. Next, a distance matrix between the to-be-tracked position points and the reference position points is constructed according to all distance sets. That is, a point transformation relationship is constructed. The point transformation relationship is specifically a position point transformation formula.

In another example, the terminal may alternatively map the plurality of to-be-tracked position points to the reference image according to a preset coordinate axis transformation formula, to obtain a plurality of mapped position points. Then, the terminal may construct a point transformation relationship between the plurality of mapped position points and the plurality of reference position points.

Specifically, in some embodiments, the step of constructing, by the terminal, a point transformation relationship between the plurality of mapped position points and the plurality of reference position points may specifically include:

(31) mapping, by the terminal, the plurality of to-be-tracked position points to the reference image according to the preset coordinate axis transformation formula, to obtain the plurality of mapped position points; and

(32) constructing, by the terminal, the point transformation relationship between the plurality of mapped position points and the plurality of reference position points.

Specifically, the point transformation relationship between the plurality of mapped position points and the plurality of reference position points may be constructed by calculating matching degrees between the mapped position points and the reference position points, to construct the point transformation relationship between the to-be-tracked image block and the reference image block.

Specifically, in some embodiments, the step of constructing, by the terminal, a point transformation relationship between the plurality of mapped position points and the plurality of reference position points may specifically include for each mapped point in the plurality of mapped points, calculating, by the device, matching scores between the each mapped point and the plurality of reference points to obtain a matching score set; and constructing, by the device, the point transformation relationship between the plurality of to-be-tracked position points and the plurality of reference position points according to the matching score set. In some embodiments, the step of constructing, by the terminal, a point transformation relationship between the plurality of mapped position points and the plurality of reference position points may specifically include:

(41) determining, by the terminal, a mapped position point that needs to be processed currently, to obtain a currently processed mapped position point;

(42) calculating, by the terminal, matching degrees between the currently processed mapped position point and the plurality of reference position points, to obtain a matching degree set;

(43) returning, by the terminal, to the operation of determining a mapped position point that needs to be processed currently until matching degrees between each mapped position point and the plurality of reference position points are calculated; and

(44) constructing, by the terminal, a point transformation relationship between the to-be-tracked position points and the reference position points according to the matching degree set.

In this embodiment, the terminal may first map the plurality of to-be-tracked position points to the reference image according to the preset coordinate axis transformation formula, to obtain a plurality of mapped position points. Then, the terminal may determine a mapped position point that needs to be processed currently, to obtain a currently processed mapped position point. Next, the terminal may calculate matching degrees between the currently processed mapped position point and the plurality of reference position points, to obtain a matching degree set. There are a plurality of methods for calculating, by the terminal, matching degrees between the currently processed mapped position point and the plurality of reference position points. For example, the terminal may directly calculate direct distances between the mapped position point and the plurality of reference position points. Then, the terminal may use a reference position point with a smallest distance to the mapped position point as the best matched reference position point. Then, the terminal returns to the operation of determining a mapped position point that needs to be processed currently until matching degrees between each mapped position point and the plurality of reference position points are calculated. Finally, the terminal constructs the point transformation relationship between the to-be-tracked position points and the reference position points according to the matching degree set.

Figure 2E:
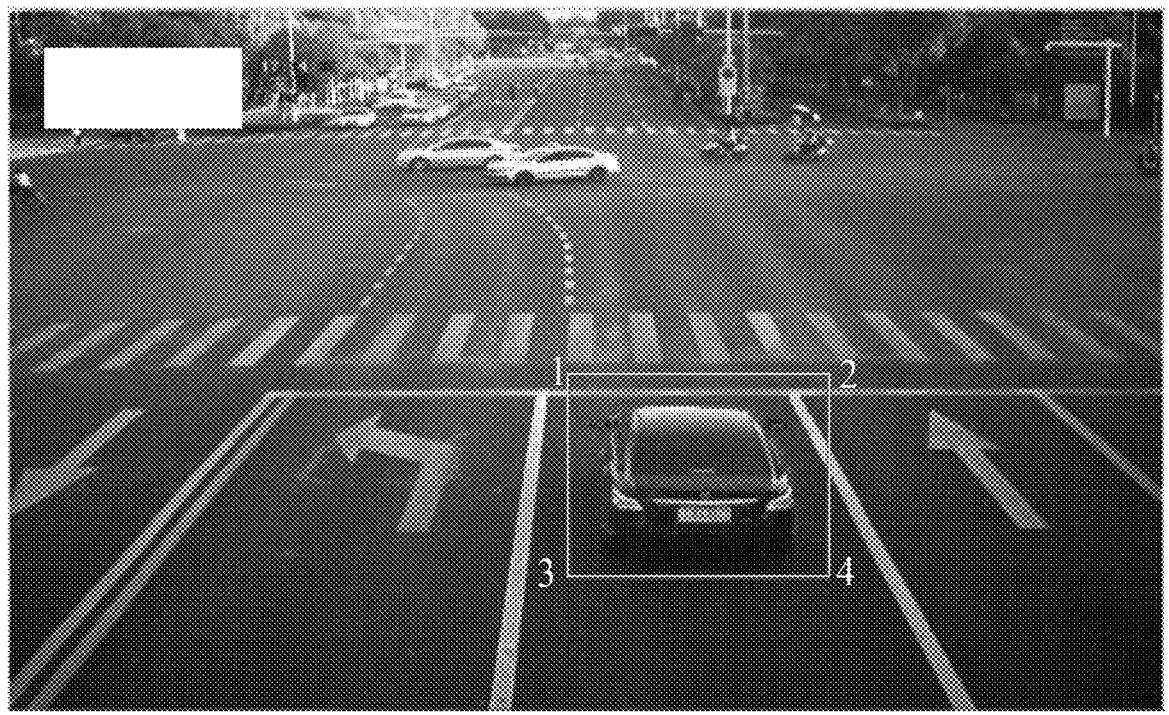
FIG. 2E is a second example diagram of an obtained to-be-tracked image in an object information obtaining method according to an embodiment of this application.
Figure 2F:
FIG. 2F is a second example diagram of an obtained reference image in an object information obtaining method according to an embodiment of this application.

In another example, refer to FIG. 2E and FIG. 2F. FIG. 2E is a second example diagram of an obtained to-be-tracked image in the vehicle information obtaining method according to an embodiment of this application. FIG. 2F is a second example diagram of an obtained reference image in the vehicle information obtaining method according to an embodiment of this application. In FIG. 2E, to-be-tracked position points may mark a vehicle in the to-be-tracked image. That is, as shown by reference numerals 1 to 4 in FIG. 2E, an image of each vehicle corresponds to to-be-tracked position points. As shown by reference numerals 1 to 4 in FIG. 2F, an image of each vehicle in the reference image corresponds to reference position points. However, in some scenarios, when a vehicle in the to-be-tracked image has a relatively large size, and blocks another vehicle, to-be-tracked position points of the blocked vehicle are missing. Therefore, in this embodiment, the terminal may alternatively calculate Euclidean distances between a current mapped position point and the plurality of reference position points. Then, the terminal may construct a distance matrix according to the Euclidean distances between the current mapped position point and the plurality of reference position points. Next, the terminal returns to the step of determining a mapped position point that needs to be processed currently until Euclidean distances between each mapped position point and the plurality of reference position points are calculated. Then, the terminal may match the plurality of mapped position points with the plurality of reference position points by using a preset algorithm, to obtain a matching degree set. Finally, the terminal constructs the point transformation relationship between the to-be-tracked position points and the reference position points according to the matching degree set.

The preset algorithm for matching the plurality of mapped position points with the plurality of reference position points may be a Hungarian algorithm, or may be another algorithm, which is specifically determined according to an actual situation. In this embodiment, the Hungarian algorithm is used as an example for description. After calculating the Euclidean distances between each mapped position point and the plurality of reference position points, the terminal allocates at most one reference position point to each mapped position point by using the preset Hungarian algorithm. A case that each mapped position point corresponds to a reference position point is referred to as a full match. That is, each vehicle in the to-be-tracked image has one vehicle corresponding to the vehicle in the reference image. A case that some reference position points do not correspond to mapped position points, that is, some to-be-tracked position points in the to-be-tracked image are missing, is referred to as a maximum match. In this case, the terminal may re-obtain a to-be-tracked image, that is, perform step 201 again.

In addition, the Hungarian algorithm is an algorithm to find a maximum match of a bipartite graph with an augmenting path. The bipartite graph is defined as follows: In short, if points in a graph may be divided into two groups, and all edges cross boundaries of the groups, the graph is a bipartite graph. To be exact, vertices of a graph are divided into two disjoint sets U and V, and each edge connects vertices in U and V. If such division exists, the graph is a bipartite graph. An equivalent definition of the bipartite graph is a graph that does not include an odd-length cycles.

The maximum match is defined as follows: In all matches of a graph, a match having the most match edges is referred to as a maximum match of the graph.

The full match is defined as follows: In a match of a graph, if all vertices are matched points, it is a full match.

The coordinate axis transformation formula may be established in advance by the terminal. That is, before the step of extracting, by the terminal, a to-be-tracked image block of a preset area from the to-be-tracked image, and extracting a reference image block of a preset area from the reference image, the method may specifically further include:

(51) marking, by the terminal, corresponding coordinate points in each of the to-be-tracked image and the reference image; and (52) constructing, by the terminal, the coordinate axis transformation formula between the to-be-tracked image and the reference image according to a correspondence between the coordinate points of the to-be-tracked image and the coordinate points of the reference image.

For example, specifically, the terminal may mark the coordinate points in each of the to-be-tracked image and the reference image, and each of the coordinate points may be represented by a two-dimensional vector (x, y). Then, the terminal may construct a transformation matrix, that is, the coordinate axis transformation formula, of the coordinate points based on a principle of perspective transformation.

Figure 2G:
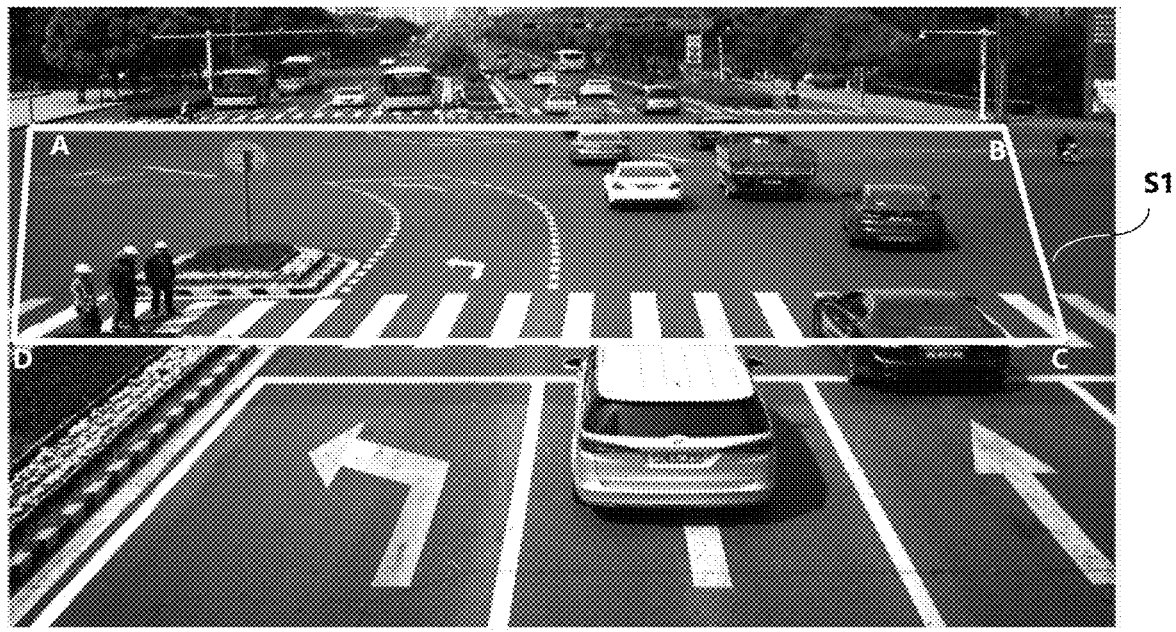
FIG. 2G is a schematic diagram of a to-be-tracked image according to an embodiment of this application.
Figure 2H:
FIG. 2H is a schematic diagram of a reference image corresponding to the to-be-tracked image in FIG. 2G according to an embodiment of this application.
Figure 2I:
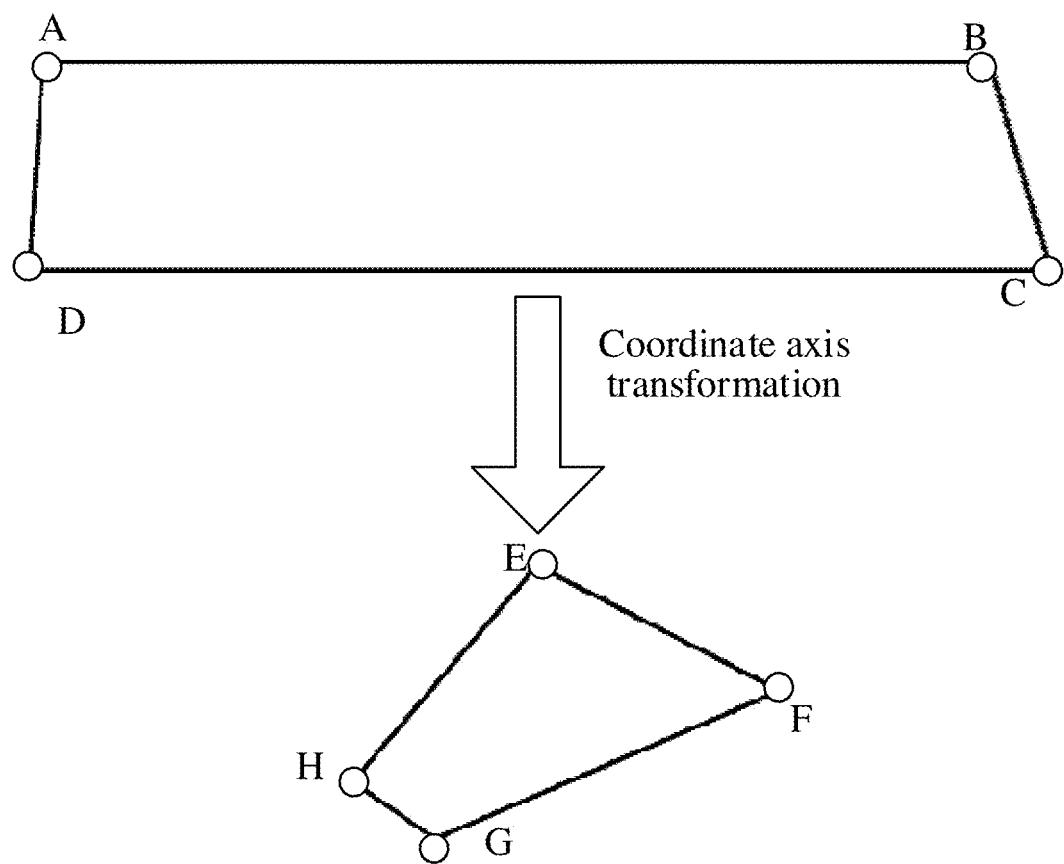
FIG. 2I is a schematic diagram of a transformation from a to-be-tracked image to a reference image according to an embodiment of this application.

For example, refer to FIG. 2G, FIG. 2H, and FIG. 2I. FIG. 2G is a schematic diagram of a to-be-tracked image according to an embodiment of this application. FIG. 2H is a schematic diagram of a reference image corresponding to the to-be-tracked image in FIG. 2G according to an embodiment of this application. FIG. 2I is a schematic diagram of a transformation from the to-be-tracked image to the reference image according to an embodiment of this application. The terminal may mark, according to an input of a user, coordinate points shown by reference numerals A to D in FIG. 2G in the to-be-tracked image, and mark coordinate points shown by reference numerals E to H in FIG. 2H in the reference image. Referring to FIG. 2G, in the to-be-tracked image, the marked coordinate points A to D form a first preset area S 1. Referring to FIG. 2H, in the reference image, the marked coordinate points E to H form a second preset area R1. It can be seen from FIG. 2G and FIG. 2H that, the first area Si in FIG. 2G and the area R1 in FIG. 2H are the same intersection area in an actual scenario. Referring to FIG. 2I, a coordinate axis transformation formula or a transformation matrix may be constructed according to a correspondence between the marked coordinate points A to D in the to-be-tracked image and the marked coordinate points E to H in the reference image. Each marked coordinate point may be represented by a two-dimensional vector (x, y). The coordinate axis transformation formula is applicable to any point of the same area in the actual scenario included in the to-be-tracked image and the reference image.

A perspective transformation is a projection transformation of a central projection, and is a linear fractional transformation of a plane when expressed in non-homogeneous projective coordinates. The projection transformation refers to a process of transforming a three-dimensional item or object in a space coordinate system into a two-dimensional image. According to different distances between a viewpoint (a projection center) and the projection plane, the projection may be classified into a parallel projection and a perspective projection. The perspective projection is the perspective transformation. The distance between a viewpoint (a projection center) of the parallel projection and the projection plane is infinite, but for the perspective projection (transformation), the distance is finite. The perspective projection has a characteristic of a perspective reduction effect. That is, a size of a perspective projection of a three-dimensional item or object is inversely proportional to a distance from a body to the viewpoint (the projection center). For example, for two straight line segments of an equal length that are both parallel to the projection plane, the line segment close to the projection center has a large perspective projection, and the line segment far from the projection center has a small perspective projection. A visual effect generated by the effect is similar to that of a human visual system. Compared with the parallel projection, the perspective projection has a stronger depth perception and looks more realistic, but the perspective projection does not really reflect an exact size or shape of an item.

Step 204. The terminal obtains a position of a reference point in the reference image corresponding to a to-be-tracked point in the to-be-tracked image based on the point transformation relationship, to determine an object in the reference image corresponding to the at least one object.

For example, specifically, the terminal may determine the position of the corresponding reference position point of the to-be-tracked position point in the to-be-tracked image in the reference image based on the point transformation relationship. Then, the terminal may obtain, according to the position of the corresponding reference position point of the to-be-tracked position point in the reference image, vehicle information of a vehicle corresponding to the to-be-tracked position point. For example, the terminal may determine that the to-be-tracked position points 1 to 4 in FIG. 2E correspond to the reference position points 1 to 4 in FIG. 2F. That is, the terminal may determine that a vehicle encircled by the reference position points 1 to 4 in FIG. 2E correspond to a vehicle encircled by the reference position points 1 to 4 in FIG. 2F. That is, both vehicles are the same vehicle. The terminal then obtains a motion track of the vehicle in the reference image according to the vehicle information such as a vehicle identifier and a position in the reference image. In this manner, a position of each vehicle in a picture may be detected from a sequence of continuous frames in a surveillance footage, and the same identifier is assigned to the same vehicle. With an identifier assigned to a target vehicle in a to-be-tracked image, the target vehicle may be found in a corresponding reference image, to establish a linkage relationship.

Specifically, in some embodiments, after the step of obtaining, by the terminal, a position of a corresponding reference position point of a to-be-tracked position point in the to-be-tracked image in the reference image based on the point transformation relationship, the method may specifically further include:

(61) obtaining, by the terminal according to the position of the corresponding reference position point of the to-be-tracked position point in the to-be-tracked image in the reference image, the vehicle information of the vehicle corresponding to the to-be-tracked position point;

(62) determining, by the terminal, the position of the vehicle in the reference image according to the vehicle information; and (63) obtaining, by the terminal, the motion track of the vehicle in the reference image according to the position of the vehicle in the reference image.

The object information obtaining method according to the embodiments of this application is described below by using another specific example.

The terminal may preset, according to an input of a user, marked coordinate points shown by reference numerals A to D in FIG. 2G in the to-be-tracked image and marked coordinate points shown by reference numerals E to H in FIG. 2H in the reference image. Referring to FIG. 2I, a coordinate axis transformation formula or a transformation matrix, referred to as a preset coordinate axis transformation formula, may be constructed according to a correspondence between the marked coordinate points A to D in the to-be-tracked image and the marked coordinate points E to H in the reference image. The to-be-tracked image is, for example, an image photographed by a fixed-position low-altitude camera, and the reference image is, for example, an image photographed by a fixed-position high-altitude camera. The to-be-tracked image and the reference image are, for example, images including the same area in a real scenario but at different photographing angles. The coordinate axis transformation formula is applicable to all images photographed by the low-altitude camera and the high-altitude camera.

According to this embodiment of this application, after obtaining the preset coordinate axis transformation formula, the terminal obtains a to-be-tracked image including at least one object and at least one reference image including a plurality of objects, extracts a to-be-tracked image block from the to-be-tracked image, and extracts a reference image block from the reference image. The to-be-tracked image block includes a plurality of to-be-tracked position points used for marking object position information in the to-be-tracked image, and the reference image block includes a plurality of reference position points used for marking object position information in the reference image. The terminal constructs a point transformation relationship between the to-be-tracked image block and the reference image block based on a position relationship between the plurality of to-be-tracked position points and a position relationship between the plurality of reference position points, and obtains a position of a corresponding reference position point of a to-be-tracked position point in the to-be-tracked image in the reference image based on the point transformation relationship, to determine an object corresponding to the at least one object in the reference image.

The extracting a to-be-tracked image block from the to-be-tracked image, and extracting a reference image block from the reference image includes: recognizing the at least one object from the to-be-tracked image through image recognition, and extracting the to-be-tracked image block according to the at least one object, an area of the to-be-tracked image block including an area in which the at least one object is located; and recognizing the plurality of objects from the reference image through image recognition, and respectively extracting, according to the plurality of objects, a plurality of reference image blocks corresponding to the plurality of objects, an area of each reference image block including an area in which an object corresponding to the reference image block is located.

Figure 2J:
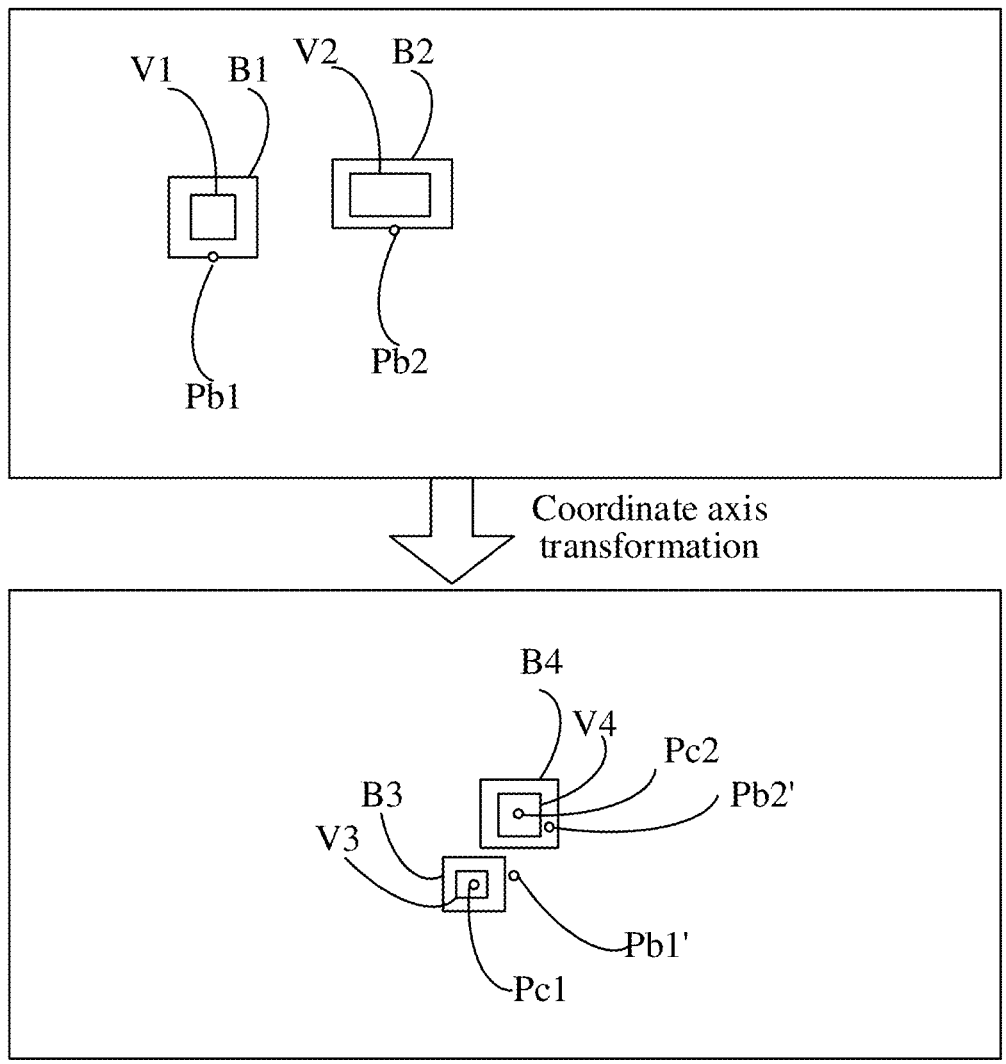
FIG. 2J is a schematic diagram of a to-be-tracked position point and a reference position point according to an embodiment of this application.
Figure 2K:
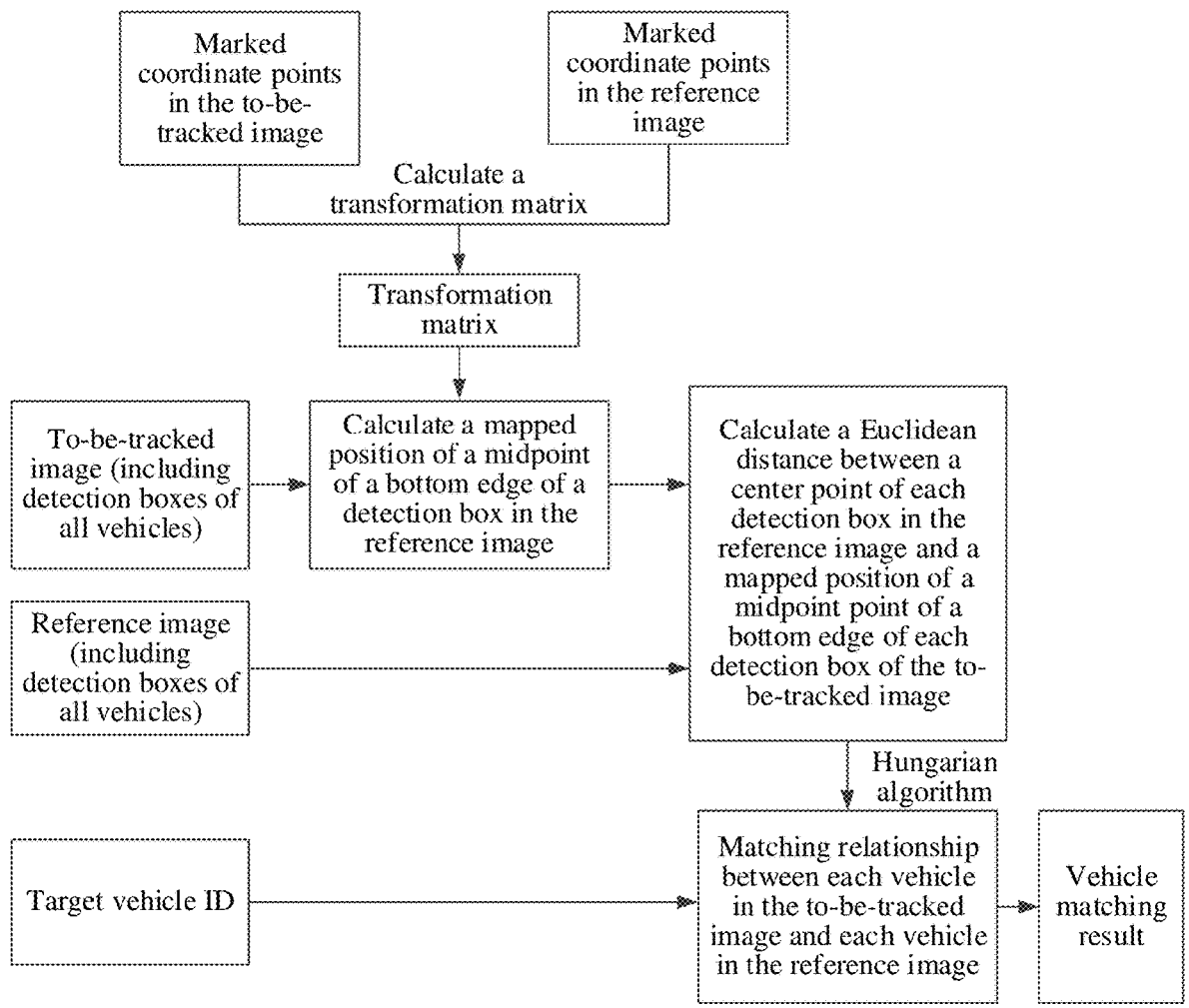
FIG. 2K is another schematic application diagram of an object information obtaining method according to an embodiment of this application.

Specifically, for example, referring to FIG. 2J, the terminal may recognize vehicles, for example, V1 and V2, in the to-be-tracked image through image recognition. The vehicles V1 and V2 are marked by using detection boxes B1 and B2 respectively. The detection boxes may be rectangular boxes, and are used for marking positions of the vehicles in the to-be-tracked image. The detection blocks B1 and B2 may be to-be-tracked image blocks. The detection boxes B1 and B2 may be represented by coordinates of upper left corners and lower right corners thereof. The upper left corners and the lower right corners of the detection boxes B1 and B2 may be to-be-tracked position points. The terminal then recognizes vehicles V3 and V4 in the reference image through image recognition, and respectively marks the vehicles V3 and V4 by using detection boxes B3 and B4. The detection boxes B3 and B4 may be reference image blocks. Similar to the to-be-tracked image, the detection boxes in the reference image may be rectangular boxes, and are used for marking positions of the vehicles in the reference image. The detection boxes may be represented by coordinates of upper left corners and lower right corners thereof. The upper left corners and the lower right corners of the detection boxes B3 and B4 may be reference position points.

The constructing, by the terminal, a point transformation relationship between the to-be-tracked image block and the reference image block based on a position relationship between the plurality of to-be-tracked position points and a position relationship between the plurality of reference position points includes: calculating a midpoint position of a bottom edge of the to-be-tracked image block based on the upper left corner and lower right corner position points of the to-be-tracked image block, to obtain a midpoint to-be-tracked position point (or to-be-tracked midpoint); calculating center positions of the plurality of reference image blocks based on the upper left corner and lower right corner position points of the plurality of reference image blocks, to obtain a plurality of center reference position points (or reference center points); mapping the midpoint to-be-tracked position point to the reference image according to the preset coordinate axis transformation formula, to obtain a mapped position point; and constructing a point transformation relationship between the mapped position point and the plurality of center reference position points.

Specifically, the terminal obtains a point of a bottom edge of the detection box B1 of the vehicle V1, for example, a midpoint Pb1 of the bottom edge. For example, the midpoint Pb1 is obtained through calculation according to the coordinates of the upper left corner and the lower right corner of the detection box B1. Pixels of the upper left corner, the lower left corner, and the midpoint Pb1 of the detection box B1 may be to-be-tracked position points. Center points Pc1 and Pc2 of the detection boxes B3 and B4 of the vehicles in the reference image are then obtained. For example, the center point Pc1 is obtained through calculation according to the coordinates of the upper left corner and the lower right corner of the detection box V3. For example, the center point Pc2 is obtained through calculation according to the coordinates of the upper left corner and the lower right corner of the detection box V4. The center points Pc1 and Pc2 are reference position points.

In this example, it is assumed that the midpoint Pb1 is used as a current to-be-tracked position point. The midpoint Pb1 is mapped to the reference image through the coordinate axis transformation matrix, to obtain Pb1', which is a mapped position point corresponding to the to-be-tracked position point Pb1. Similarly, in the to-be-tracked image, a midpoint Pb2 at a bottom edge of the detection box B2 of the vehicle V2 and a mapped position point Pb2' of the midpoint Pb2 in the reference image may be obtained.

The constructing, by the terminal, a point transformation relationship between the mapped position point and the plurality of center reference position points includes: calculating matching degrees between the mapped position point and the plurality of center reference position points, to obtain a matching degree set; and constructing a point transformation relationship between the midpoint to-be-tracked position point and the plurality of center reference position points according to the matching degree set.

For example, the terminal may calculate a distance between each of the mapped position points Pb1 and Pb2 and each of the reference position points Pb1' and Pb2', to obtain a distance matrix Da. Then, the terminal calculates, according to the distance matrix Da by using the Hungarian algorithm, a reference position point that most matches each mapped position point, to obtain a reference position point that most matches each to-be-tracked position point. That is, the terminal may obtain the position of the corresponding reference position point of the to-be-tracked position point in the to-be-tracked image in the reference image.

The obtaining a position of a corresponding reference position point of a to-be-tracked position point in the to-be-tracked image in the reference image based on the point transformation relationship, to determine an object corresponding to the at least one object in the reference image includes: obtaining, based on the point transformation relationship between the midpoint to-be-tracked position point and the plurality of center reference position points, a center reference position point corresponding to the midpoint to-be-tracked position point, and determining an object in a reference image block in which the corresponding center reference position point is located as an object corresponding to the at least one object.

The to-be-tracked position point may mark the vehicle in the to-be-tracked image. For example, as shown in FIG. 2J, the to-be-tracked position point Pb1 may be used for marking the vehicle V1, and Pb2 may be used for marking the vehicle V2. In the reference image, an image of each vehicle corresponds to a reference position point. For example, as shown in FIG. 2J, the reference position point Pc1 is used for marking the vehicle V3, and the reference position point Pc2 is used for marking the vehicle V4. The vehicle in the reference image corresponding to the vehicle in the to-be-tracked image may be obtained by obtaining the reference position point that most matches each to-be-tracked position point. That is, the terminal obtains, according to the position of the corresponding reference position point of the to-be-tracked position point in the to-be-tracked image in the reference image, vehicle information of the vehicle corresponding to the to-be-tracked position point. Subsequently, the terminal may determine a position of the vehicle in the reference image according to the vehicle information. The terminal then obtains a motion track of the vehicle in the reference image according to the position of the vehicle in the reference image. For example, in the to-be-tracked image, each detection box has an identifier (ID), that is, a to-be-tracked ID. The user may input an ID of a target vehicle in the to-be-tracked image in the terminal, to obtain an ID of the target vehicle in the reference image, and then a detection box of the target vehicle may be drawn, to help view a motion track of the vehicle and perform subsequent processing. For the foregoing procedure, refer to FIG. 2K.

In FIG. 2G to FIG. 2J, elements are marked for clarity of the figures, which are not drawn to scale. For descriptions of FIG. 2G to FIG. 2K, reference may also be made to the foregoing descriptions of other accompanying drawing.

In some scenarios, after obtaining the motion track of the vehicle in the reference image according to the position of the vehicle in the reference image, the terminal may provide road information for the user according to the movement track of the vehicle. For example, when a special vehicle such as a police vehicle performs an urgent task, after a route starting point and a route ending point are set, an optimal path may be generated according to a road condition. Fast passing of an emergency vehicle such as a police vehicle and an ambulance can be ensured for an emergency case with complex road conditions.

In another example, in some other scenarios, the terminal may use a surveillance device to capture a target vehicle and position and track the target vehicle in a map in real time, and after the target vehicle is driven out of a visual area (that is, a to-be-tracked image) of a current surveillance device, the terminal automatically switches to a next surveillance image (that is, a reference image) in which the vehicle is captured.

In the object information obtaining method provided in the embodiments, after a terminal obtains a to-be-tracked image including at least one object and at least one reference image including a plurality of objects, the terminal extracts a to-be-tracked image block from the to-be-tracked image, and extracts a reference image block from the reference image. Then, the terminal constructs a point transformation relationship between the to-be-tracked image block and the reference image block based on a position relationship between a plurality of to-be-tracked position points and a position relationship between a plurality of reference position points. Next, the terminal obtains a position of a corresponding reference position point of a to-be-tracked position point in the to-be-tracked image in the reference image based on the point transformation relationship, to determine an object corresponding to the at least one object in the reference image. Compared with the existing solution that a vehicle is tracked by using a spliced picture, the method in the embodiments of this application can avoid a problem caused by a missing, blurred, or indiscernible vehicle image. Therefore, the effectiveness and accuracy of recognition can be improved.

To better implement the object information obtaining method provided in the embodiments of this application, the embodiments of this application further provide an object information obtaining apparatus (referred to as an obtaining apparatus for short). Meanings of the terms are the same as those in the foregoing object information obtaining method. For specific implementation details, reference may be made to the descriptions in the method embodiments.

Figure 3A:
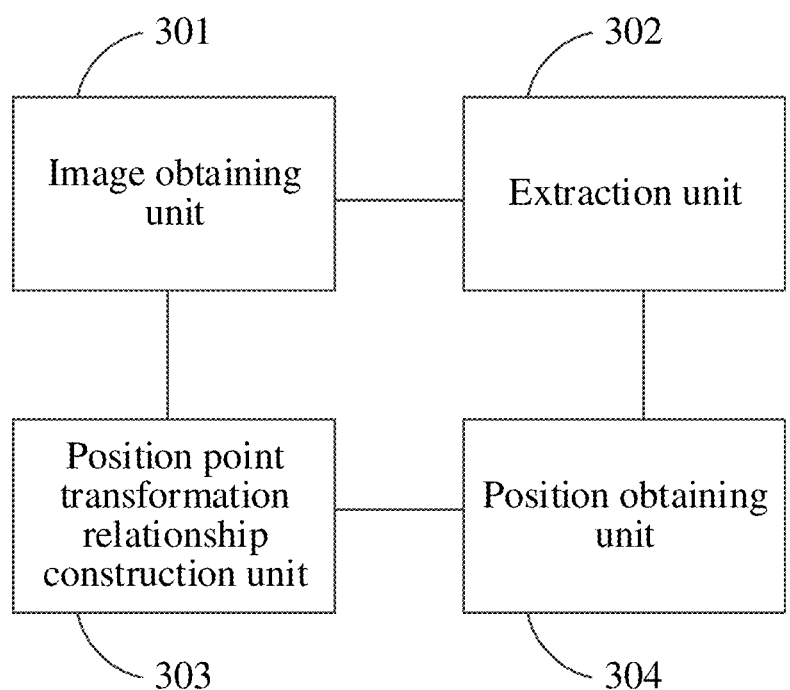
FIG. 3A is a first schematic structural diagram of an object information obtaining apparatus according to an embodiment of this application.
Figure 3B:
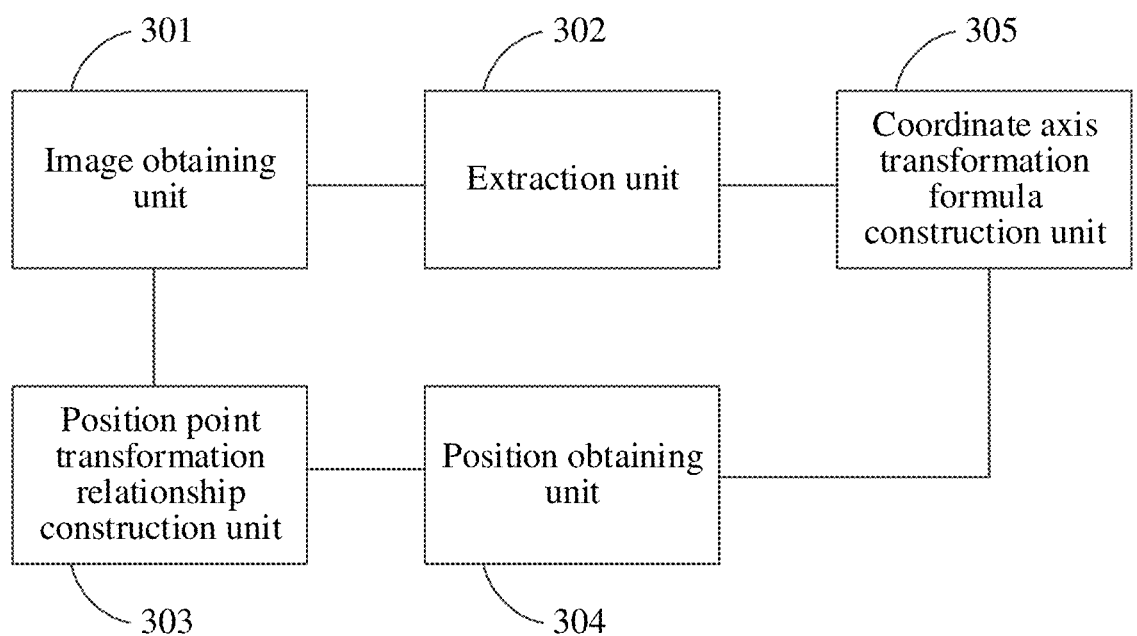
FIG. 3B is a second schematic structural diagram of an object information processing apparatus according to an embodiment of this application.

FIG. 3A is a schematic structural diagram of an object information obtaining apparatus according to an embodiment of this application. The obtaining apparatus may include an image obtaining unit 301, an extraction unit 302, a point transformation relationship construction unit 303, and a position obtaining unit 304. A specific description may be as follows:

The image obtaining unit 301 is configured to obtain a to-be-tracked image including at least one object and at least one reference image including a plurality of objects.

Specifically, the image obtaining unit 301 may be configured to obtain a to-be-tracked image including a plurality of objects and at least one reference image including a plurality of objects.

In some embodiments of this application, the image obtaining unit 301 may be specifically configured to:

(11) obtain time information of the to-be-tracked image; and

(12) obtain, based on the time information, at least one reference image including a plurality of objects.

The to-be-tracked image and the reference image may be specifically clipped from a surveillance footage, extracted from an image library, or the like.

The extraction unit 302 is configured to: extract a to-be-tracked image block from the to-be-tracked image, and extract a reference image block from the reference image. The to-be-tracked image block includes a plurality of to-be-tracked position points used for marking object position information in the to-be-tracked image, and the reference image block includes a plurality of reference position points used for marking object position information in the reference image.

For example, specifically, the extraction unit 302 may be configured to obtain information about the to-be-tracked position points in the to-be-tracked image, such as a quantity of the to-be-tracked position points and positions of the to-be-tracked position points in the to-be-tracked image. Then, an area encircled by the to-be-tracked position points is clipped according to the to-be-tracked position points, to obtain the to-be-tracked image block. Similarly, a reference image block of a preset area is extracted from the reference image in the same way. Details are not described herein again.

In some embodiments of this application, the extraction unit 302 is specifically configured to:

(21) obtain preset coordinate points;

(22) determine first position information of the preset coordinate points in the to-be-tracked image according to the preset coordinate points, and clip, from the to-be-tracked image according to the first position information, an image block of an area in which the preset coordinate points are located, to obtain the to-be-tracked image block; and

(23) determine second position information of the preset coordinate points in the reference image according to the preset coordinate points, and clip, from the reference image according to the second position information, an image block of an area in which the preset coordinate points are located, to obtain the reference image block.

The to-be-tracked position points in the to-be-tracked image and the reference position points in the reference image may be preset. A specific manner is determined according to an actual application requirement. The preset area in the to-be-tracked image and the preset area in the reference image are the same area in an actual scenario.

The point transformation relationship construction unit 303 is configured to construct a point transformation relationship between the to-be-tracked image block and the reference image block based on a position relationship between the plurality of to-be-tracked position points and a position relationship between the plurality of reference position points.

In some embodiments of this application, the point transformation relationship construction unit 303 may be specifically configured to:

a mapping subunit, configured to map the plurality of to-be-tracked position points to the reference image according to a preset coordinate axis transformation formula, to obtain a plurality of mapped position points; and a construction subunit, configured to construct a point transformation relationship between the plurality of mapped position points and the plurality of reference position points.

It may be understood that, in some embodiments of this application, the construction subunit may be specifically configured to:

(31) determine a mapped position point that needs to be processed currently, to obtain a currently processed mapped position point;

(32) calculate matching degrees between the currently processed mapped position point and the plurality of reference position points, to obtain a matching degree set;

(33) return to the operation of determining a mapped position point that needs to be processed currently until matching degrees between each mapped position point and the plurality of reference position points are calculated; and

(34) construct a point transformation relationship between the to-be-tracked position points and the reference position points according to the matching degree set.

The coordinate axis transformation formula may be established in advance. It may be understood that, referring to FIG. 3B, in some embodiments of this application, the obtaining apparatus may further include a coordinate axis transformation relationship construction unit 305. The coordinate axis transformation relationship construction unit 305 may be specifically configured to:

(41) mark coordinate points in each of the to-be-tracked image and the reference image; and

(42) construct a coordinate axis transformation formula between the to-be-tracked image and the reference image according to a correspondence between the coordinate points of the to-be-tracked image and the coordinate points of the reference image.

The position obtaining unit 304 is configured to obtain a position of a corresponding reference position point of a to-be-tracked position point in the to-be-tracked image in the reference image based on the point transformation relationship, to determine an object corresponding to the at least one object in the reference image.

For example, specifically, the position obtaining unit 304 may determine the position of the corresponding reference position point of the to-be-tracked position point in the to-be-tracked image in the reference image based on the point transformation relationship. Then, the position obtaining unit 304 may obtain, according to the position of the corresponding reference position point of the to-be-tracked position point in the reference image, object information of an object corresponding to the to-be-tracked position point, and then obtain a motion track of the object in the reference image according to the object information such as an object identifier and a position in the reference image. Then, a motion track of the object in the reference image is obtained.

Figure 3C:
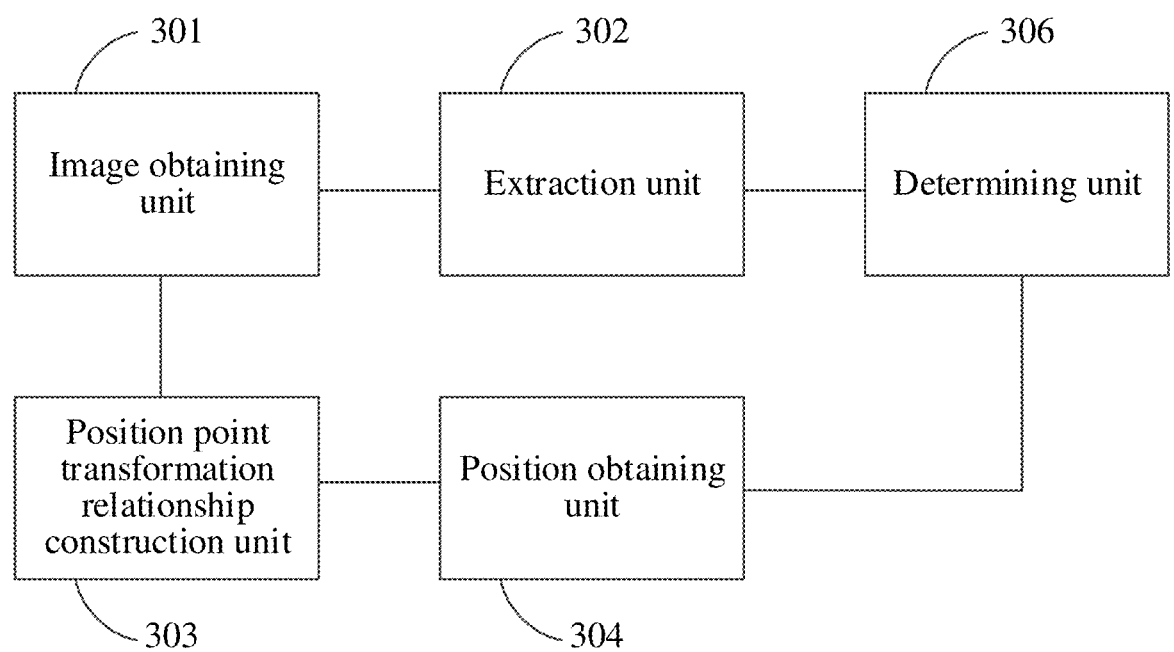
FIG. 3C is a third schematic structural diagram of an object information processing apparatus according to an embodiment of this application.

Referring to FIG. 3C, in some embodiments of this application, the obtaining apparatus may further include a determining unit 306. The determining unit 306 may be specifically configured to:

(51) obtain, according to the position of the corresponding reference position point of the to-be-tracked position point in the to-be-tracked image in the reference image, object information of the object corresponding to the to-be-tracked position point;

(52) determine a position of the object in the reference image according to the object information; and

(53) obtain a motion track of the object in the reference image according to the position of the object in the reference image.

According to this embodiment of this application, the extraction unit 302 is specifically configured to: recognize the at least one object from the to-be-tracked image through image recognition, and extract the to-be-tracked image block according to the at least one object, an area of the to-be-tracked image block including an area in which the at least one object is located; and recognize the plurality of objects from the reference image through image recognition, and respectively extract, according to the plurality of objects, a plurality of reference image blocks corresponding to the plurality of objects, an area of each reference image block including an area in which an object corresponding to the reference image block is located.

The plurality of to-be-tracked position points are upper left corner and lower right corner position points of the to-be-tracked image block, and the plurality of reference position points are upper left corner and lower right corner position points of the plurality of reference image blocks. The point transformation relationship construction unit 303 is specifically configured to: calculate a midpoint position of a bottom edge of the to-be-tracked image block based on the upper left corner and lower right corner position points of the to-be-tracked image block, to obtain a midpoint to-be-tracked position point; calculate center positions of the plurality of reference image blocks based on the upper left corner and lower right corner position points of the plurality of reference image blocks, to obtain a plurality of center reference position points; map the midpoint to-be-tracked position point to the reference image according to a preset coordinate axis transformation formula, to obtain a mapped position point; and construct a point transformation relationship between the mapped position point and the plurality of center reference position points.

The constructing a point transformation relationship between the mapped position point and a plurality of center reference position points includes: calculating matching degrees between the mapped position point and the plurality of center reference position points, to obtain a matching degree set; and constructing a point transformation relationship between the midpoint to-be-tracked position point and the plurality of center reference position points according to the matching degree set.

The position obtaining unit 304 is specifically configured to: obtain, based on the point transformation relationship between the midpoint to-be-tracked position point and the plurality of center reference position points, a center reference position point corresponding to the midpoint to-be-tracked position point, and determine an object in a reference image block in which the corresponding center reference position point is located as an object corresponding to the at least one object.

During specific implementation, the foregoing units may be implemented as independent entities, or may be randomly combined, or may be implemented as one or more entities. For specific implementation of the foregoing units, reference may be made to the foregoing method embodiments. Details are not described herein again.

In the object information obtaining apparatus provided in this embodiment of this application, after the image obtaining unit 301 obtains a to-be-tracked image including a plurality of objects and at least one reference image including a plurality of objects, the extraction unit 302 extracts a to-be-tracked image block of a preset area from the to-be-tracked image, and extracts a reference image block of a preset area from the reference image. Then, the point transformation relationship construction unit 303 constructs a point transformation relationship between the to-be-tracked image block and the reference image block based on a position relationship between the plurality of to-be-tracked position points and a position relationship between the plurality of reference position points. Next, the position obtaining unit 304 obtains a position of a corresponding reference position point of a to-be-tracked position point in the to-be-tracked image in the reference image based on the point transformation relationship. Compared with the existing solution that a vehicle is tracked by using a spliced picture, the object information obtaining apparatus in this embodiment of this application can avoid a problem caused by a missing, blurred, or indiscernible vehicle image. Therefore, the effectiveness and accuracy of recognition can be improved.

Figure 4:
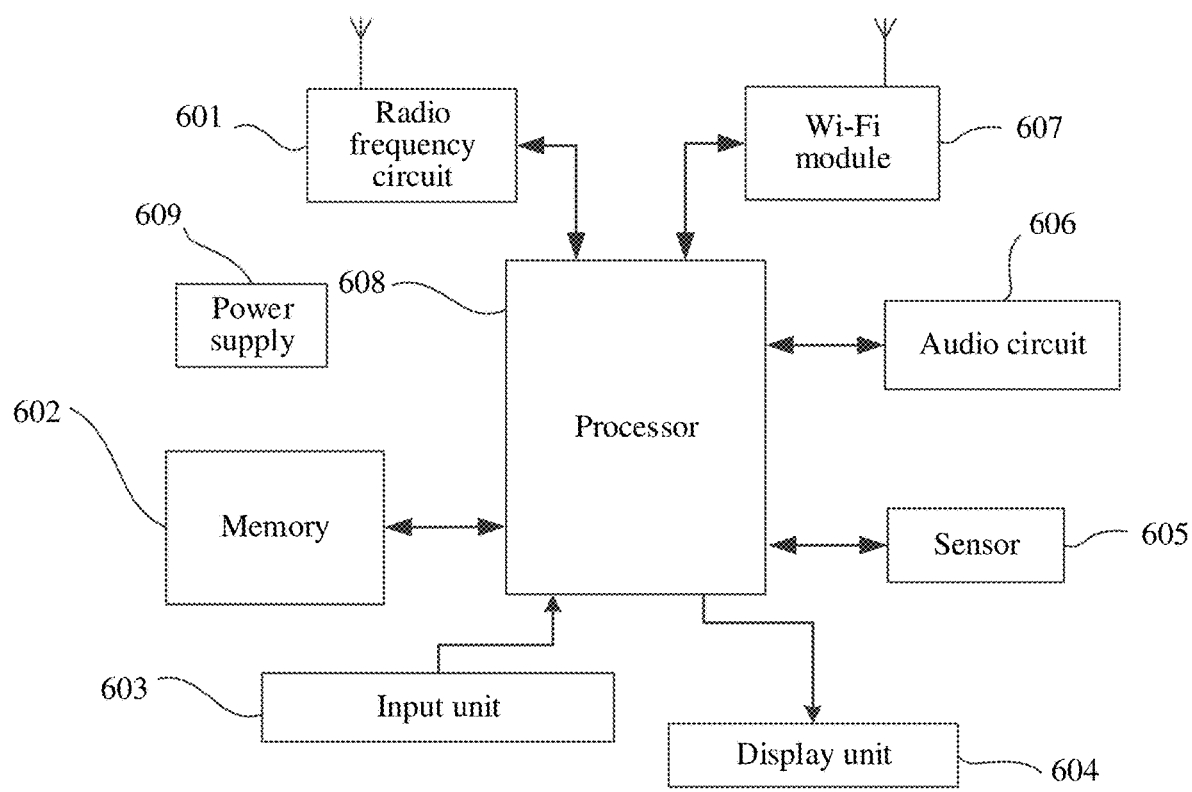
FIG. 4 is a schematic structural diagram of a terminal according to an embodiment of this application.

Correspondingly, the embodiments of this application further provide a terminal. As shown in FIG. 4, the terminal may include components such as a radio frequency (RF) circuit 601, a memory 602 including one or more computer-readable storage media, an input unit 603, a display unit 604, a sensor 605, an audio circuit 606, a wireless fidelity (Wi-Fi) module 607, a processor 608 including one or more processing cores, and a power supply 609. A person skilled in the art can understand that, the structure of the terminal shown in FIG. 4 does not constitute a limitation to the terminal, and the terminal may include more or fewer components than those shown in the figure, or some components may be combined, or a different component deployment may be used.

The RF circuit 601 may be configured to receive and send signals during an information receiving and sending process or a call process. Particularly, the RF circuit receives downlink information from a base station, then delivers the downlink information to one or more processors 608 for processing, and sends related uplink data to the base station. Generally, the RF circuit 601 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 601 may also communicate with a network and another device by wireless communication. The wireless communication may use any communication standard or protocol, which includes, but is not limited to, the Global System for Mobile Communications (GSM), general packet radio service (GPRS), Code Division Multiple Access (CDMA), Wideband Code Division Multiple Access (WCDMA), Long Term Evolution (LTE), email, short message service (SMS), and the like.

The memory 602 may be configured to store a software program and a module, and the processor 608 runs the software program and the module that are stored in the memory 602, to implement various functional applications and data processing. The memory 602 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 602 may include a high speed random access memory (RAM), and may also include a non-volatile memory, such as at least one magnetic disk storage device, a flash memory, or another volatile solid storage device. Correspondingly, the memory 602 may further include a memory controller, to provide access of the processor 608 and the input unit 603 to the memory 602.

The input unit 603 may be configured to: receive input digit or character information, and generate a keyboard, a mouse, a joystick, optical, or a track ball signal input related to the user setting and function control. Specifically, in a specific embodiment, the input unit 603 may include a touch-sensitive surface and another input device. The touch-sensitive surface, also be referred to as a touchscreen or a touch panel, may collect a touch operation of a user on or near the touch-sensitive surface (such as an operation of a user on or near the touch-sensitive surface by using any suitable item or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 608. Moreover, the touch controller can receive and execute a command sent from the processor 608. In addition, the touch-sensitive surface may be implemented using a plurality of types such as a resistive type, a capacitive type, an infrared type, and a surface acoustic wave type. In addition to the touch-sensitive surface, the input unit 603 may further include the another input device. Specifically, the another input device may include, but is not limited to, one or more of a physical keyboard, a functional key (such as a volume control key or a switch key), a track ball, a mouse, and a joystick.

The display unit 604 may be configured to display information inputted by the user or information provided for the user, and various graphical user interfaces of the terminal. The graphical user interfaces may be formed by a graph, a text, an icon, a video, or any combination thereof. The display unit 604 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 608, to determine the type of the touch event. Then, the processor 608 provides a corresponding visual output on the display panel according to the type of the touch event. Although the touch-sensitive surface and the display panel are used as two separate components to implement input and output functions in FIG. 4, in some embodiments, the touch-sensitive surface and the display panel may be integrated to implement the input and output functions.

The terminal may further include at least one sensor 605, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to ears. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not further described herein.

The audio circuit 606, a speaker, and a microphone may provide audio interfaces between the user and the terminal. The audio circuit 606 may convert received audio data into an electric signal and transmit the electric signal to the speaker. The speaker converts the electric signal into a sound signal for output. On the other hand, the microphone converts a collected sound signal into an electric signal. The audio circuit 606 receives the electric signal and converts the electric signal into audio data, and outputs the audio data to the processor 608 for processing. Then, the processor sends the audio data to, for example, another terminal by using the RF circuit 601, or outputs the audio data to the memory 602 for further processing. The audio circuit 606 may further include an earphone jack, to provide communication between a peripheral earphone and the terminal.

Wi-Fi is a short distance wireless transmission technology. The terminal may help, by using the Wi-Fi module 607, the user to receive and send an email, browse a web page, access a stream medium, and so on, which provides wireless broadband Internet access for the user. Although FIG. 4 shows the Wi-Fi module 607, it may be understood that the Wi-Fi module is not a necessary component of the terminal, and when required, the Wi-Fi module may be omitted as long as the scope of the essence of the present disclosure is not changed.

The processor 608 is the control center of the terminal, and is connected to various parts of the mobile phone by using various interfaces and lines. By running or executing the software program and/or module stored in the memory 602, and invoking data stored in the memory 602, the processor performs various functions and data processing of the terminal, thereby performing overall monitoring on the mobile phone. Optionally, the processor 608 may include one or more processing cores. Preferably, the processor 608 may integrate an application processor and a modem processor. The application processor mainly processes an operating system, a user interface, an application and the like, and the modem processor mainly processes wireless communication. It may be understood that the foregoing modem processor may either not be integrated into the processor 608.

The terminal further includes the power supply 609 (such as a battery) for supplying power to the components. Preferably, the power supply may logically connect to the processor 608 by using a power supply management system, thereby implementing functions, such as charging, discharging, and power consumption management, by using the power supply management system. The power supply 609 may further include one or more of a direct current or alternating current power supply, a re-charging system, a power failure detection circuit, a power supply converter or inverter, a power supply state indicator, and any other component.

Although not shown in the figure, the terminal may further include a camera, a Bluetooth module, and the like. Details are not described herein again. Specifically, in this embodiment, the processor 608 in the terminal may load executable files corresponding to processes of one or more application programs to the memory 602 according to the following instructions, and the processor 608 runs the application programs stored in the memory 602 to implement various functions:

obtaining a to-be-tracked image including at least one object and at least one reference image including a plurality of objects; extracting a to-be-tracked image block from the to-be-tracked image, and extracting a reference image block from the reference image, the to-be-tracked image block including a plurality of to-be-tracked position points used for marking object position information in the to-be-tracked image, and the reference image block including a plurality of reference position points used for marking object position information in the reference image; constructing a point transformation relationship between the to-be-tracked image block and the reference image block based on a position relationship between the plurality of to-be-tracked position points and a position relationship between the plurality of reference position points; and obtaining a position of a corresponding reference position point of a to-be-tracked position point in the to-be-tracked image in the reference image based on the point transformation relationship, to determine an object corresponding to the at least one object in the reference image.

In this embodiment of this application, after a to-be-tracked image including at least one object and at least one reference image including a plurality of objects are obtained, a to-be-tracked image block of a preset area is extracted from the to-be-tracked image, and a reference image block of a preset area is extracted from the reference image. Then, a point transformation relationship between the to-be-tracked image block and the reference image block is constructed based on a position relationship between a plurality of to-be-tracked position points and a position relationship between a plurality of reference position points. Next, a position of a corresponding reference position point of a to-be-tracked position point in the to-be-tracked image in the reference image is obtained based on the point transformation relationship. Compared with the existing solution that a vehicle is tracked by using a spliced picture, this application can avoid a problem caused by a missing, blurred, or indiscernible vehicle image. Therefore, the effectiveness and accuracy of recognition can be improved.

A person of ordinary skill in the art can understand that, all or some steps of the methods of the foregoing embodiments may be implemented through instructions, or implemented through instructions controlling relevant hardware, and the instructions may be stored in a computer-readable storage medium and loaded and executed by the processor.

Accordingly, the embodiments of this application provide a storage medium, storing a plurality of instructions, the instructions being capable of being loaded by the processor, to perform the steps in any vehicle information obtaining method according to the embodiments of this application. For example, the instructions may perform the following steps:

after obtaining a to-be-tracked image including a plurality of vehicles and at least one reference image including a plurality of vehicles, extracting a to-be-tracked image block of a preset area from the to-be-tracked image, and extracting a reference image block of a preset area from the reference image; then constructing a point transformation relationship between the to-be-tracked image block and the reference image block based on a position relationship between the plurality of to-be-tracked position points and a position relationship between the plurality of reference position points; and next, obtaining a position of a corresponding reference position point of a to-be-tracked position point in the to-be-tracked image in the reference image based on the point transformation relationship.

For a specific implementation of each of the foregoing operations, reference may be made to the foregoing embodiments. Details are not described herein again.

The storage medium may include: a read-only memory (ROM), a RAM, a magnetic disk, an optical disc, or the like.

Because the instructions stored in the storage medium may perform the steps of any vehicle information obtaining method according to the embodiments of this application, the instructions can implement beneficial effects that may be implemented by any vehicle information obtaining method in the embodiments of this application. For details, refer to the foregoing embodiments. Details are not described herein again.

The vehicle information obtaining method and apparatus, and the storage medium provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application.

What is claimed is:

1. A method for obtaining object information, the method comprising:
  obtaining, by a device comprising a memory storing instructions and a processor in communication with the memory, a to-be-tracked image and at least one reference image, the to-be-tracked image comprising at least one object, and the at least one reference image comprising a plurality of objects;
  extracting, by the device, a to-be-tracked image block from the to-be-tracked image and extracting a reference image block from a reference image of the at least one reference image, the to-be-tracked image block comprising a plurality of to-be-tracked points used for marking object information in the to-be-tracked image, and the reference image block comprising a plurality of reference points used for marking object information in the reference image, by:
    recognizing, by the device, the at least one object from the to-be-tracked image through image recognition, and extracting the to-be-tracked image block according to the at least one object, an area of the to-be-tracked image block comprising an area in which the at least one object is located, and
    recognizing, by the device, the plurality of objects from the reference image through image recognition, and respectively extracting, according to the plurality of objects, a plurality of reference image blocks corresponding to the plurality of objects, an area of each reference image block comprising an area in which an object in the plurality of objects is located;
  constructing, by the device, a point transformation relationship between the to-be-tracked image block and the reference image block based on a position relationship between the plurality of to-be-tracked points and a position relationship between the plurality of reference points, the plurality of to-be-tracked points comprising upper left corner and lower right corner points of the to-be-tracked image block, and the plurality of reference points comprising upper left corner and lower right corner points of the plurality of reference image blocks, by:
    calculating, by the device, a midpoint of a bottom edge of the to-be-tracked image block based on the upper left corner and lower right corner points of the to-be-tracked image block, to obtain a to-be-tracked midpoint,
    calculating, by the device, center points of the plurality of reference image blocks based on the upper left corner and lower right corner points of the plurality of reference image blocks, to obtain a plurality of reference center points,
    mapping, by the device, the to-be-tracked midpoint to the reference image according to a preset coordinate axis transformation formula, to obtain a mapped midpoint, and
    constructing, by the device, the point transformation relationship between the mapped midpoint and the plurality of reference center points; and
  obtaining, by the device, a position of a reference point in the reference image corresponding to a to-be-tracked point in the to-be-tracked image based on the point transformation relationship, to determine an object in the reference image corresponding to the at least one object.

2. The method according to claim 1, wherein the constructing the point transformation relationship between the to-be-tracked image block and the reference image block based on the position relationship between the plurality of to-be-tracked points and the position relationship between the plurality of reference points comprises:
  mapping, by the device, the plurality of to-be-tracked points to the reference image according to a preset coordinate axis transformation formula, to obtain a plurality of mapped points; and
  constructing, by the device, the point transformation relationship between the plurality of mapped points and the plurality of reference points.

3. The method according to claim 2, wherein the constructing the point transformation relationship between the plurality of mapped points and the plurality of reference points comprises:
  for each mapped point in the plurality of mapped points:
    calculating, by the device, matching scores between the each mapped point and the plurality of reference points to obtain a matching score set; and
  constructing, by the device, the point transformation relationship between the plurality of to-be-tracked points and the plurality of reference points according to the matching score set.

4. The method according to claim 3, wherein before the extracting the to-be-tracked image block from the to-be-tracked image and extracting the reference image block from the reference image, the method further comprises:
  marking, by the device, coordinate points in each of the to-be-tracked image and the reference image; and
  constructing, by the device, the preset coordinate axis transformation formula between the to-be-tracked image and the reference image according to a correspondence between the coordinate points of the to-be-tracked image and the coordinate points of the reference image.

5. The method according to claim 1, wherein the constructing the point transformation relationship between the mapped midpoint and the plurality of reference center points comprises:
  calculating, by the device, matching scores between the mapped midpoint and the plurality of reference center points, to obtain a matching score set; and
  constructing, by the device, the point transformation relationship between the to-be-tracked midpoint and the plurality of reference center points according to the matching score set.

6. An apparatus for obtaining object information, the apparatus comprising:
  a memory storing instructions; and
  a processor in communication with the memory, wherein, when the processor executes the instructions, the processor is configured to cause the apparatus to:

obtain a to-be-tracked image and at least one reference image, the to-be-tracked image comprising at least one object, and the at least one reference image comprising a plurality of objects, extract a to-be-tracked image block from the to-be-tracked image and extract a reference image block from a reference image of the at least one reference image, the to-be-tracked image block comprising a plurality of to-be-tracked points used for marking object information in the to-be-tracked image, and the reference image block comprising a plurality of reference points used for marking object information in the reference image by:

recognizing the at least one object from the to-be-tracked image through image recognition, and extracting the to-be-tracked image block according to the at least one object, an area of the to-be-tracked image block comprising an area in which the at least one object is located, and recognizing the plurality of objects from the reference image through image recognition, and respectively extracting, according to the plurality of objects, a plurality of reference image blocks corresponding to the plurality of objects, an area of each reference image block comprising an area in which an object in the plurality of objects is located, construct a point transformation relationship between the to-be-tracked image block and the reference image block based on a position relationship between the plurality of to-be-tracked points and a position relationship between the plurality of reference points, the plurality of to-be-tracked points comprising upper left corner and lower right corner points of the to-be-tracked image block, and the plurality of reference points comprising upper left corner and lower right corner points of the plurality of reference image blocks, by:

calculating a midpoint of a bottom edge of the to-be-tracked image block based on the upper left corner and lower right corner points of the to-be-tracked image block, to obtain a to-be-tracked midpoint, calculating center points of the plurality of reference image blocks based on the upper left corner and lower right corner points of the plurality of reference image blocks, to obtain a plurality of reference center points, mapping the to-be-tracked midpoint to the reference image according to a preset coordinate axis transformation formula, to obtain a mapped midpoint, and constructing the point transformation relationship between the mapped midpoint and the plurality of reference center points, and obtain a position of a reference point in the reference image corresponding to a to-be-tracked point in the to-be-tracked image based on the point transformation relationship, to determine an object in the reference image corresponding to the at least one object.

7. The apparatus according to claim 6, wherein, when the processor is configured to cause the apparatus to construct the point transformation relationship between the to-be-tracked image block and the reference image block based on the position relationship between the plurality of to-be-tracked points and the position relationship between the plurality of reference points, the processor is configured to cause the apparatus to:

map the plurality of to-be-tracked points to the reference image according to a preset coordinate axis transformation formula, to obtain a plurality of mapped points, and construct the point transformation relationship between the plurality of mapped points and the plurality of reference points.

8. The apparatus according to claim 7, wherein, when the processor is configured to cause the apparatus to construct the point transformation relationship between the plurality of mapped points and the plurality of reference points, the processor is configured to cause the apparatus to:

for each mapped point in the plurality of mapped points:
calculate matching scores between the each mapped point and the plurality of reference points to obtain a matching score set; and construct the point transformation relationship between the plurality of to-be-tracked points and the plurality of reference points according to the matching score set.

9. The apparatus according to claim 8, wherein, when the processor is configured to cause the apparatus to extract the to-be-tracked image block from the to-be-tracked image and extract the reference image block from the reference image, the processor is configured to cause the apparatus to:

mark coordinate points in each of the to-be-tracked image and the reference image; and construct the preset coordinate axis transformation formula between the to-be-tracked image and the reference image according to a correspondence between the coordinate points of the to-be-tracked image and the coordinate points of the reference image.

10. The apparatus according to claim 6, wherein, when the processor is configured to cause the apparatus to construct the point transformation relationship between the mapped midpoint and the plurality of reference center points, the processor is configured to cause the apparatus to:

calculate matching scores between the mapped midpoint and the plurality of reference center points, to obtain a matching score set; and construct the point transformation relationship between the to-be-tracked midpoint and the plurality of reference center points according to the matching score set.

11. A non-transitory computer readable storage medium storing computer readable instructions, wherein, the computer readable instructions, when executed by a processor, are configured to cause the processor to perform:

obtaining a to-be-tracked image and at least one reference image, the to-be-tracked image comprising at least one object, and the at least one reference image comprising a plurality of objects;

extracting a to-be-tracked image block from the to-be-tracked image and extracting a reference image block from a reference image of the at least one reference image, the to-be-tracked image block comprising a plurality of to-be-tracked points used for marking object information in the to-be-tracked image, and the reference image block comprising a plurality of reference points used for marking object information in the reference image, by:

recognizing the at least one object from the to-be-tracked image through image recognition, and extracting the to-be-tracked image block according to the at least one object, an area of the to-be-tracked image block comprising an area in which the at least one object is located, and recognizing the plurality of objects from the reference image through image recognition, and respectively extracting, according to the plurality of objects, a plurality of reference image blocks corresponding to the plurality of objects, an area of each reference image block comprising an area in which an object in the plurality of objects is located;

constructing a point transformation relationship between the to-be-tracked image block and the reference image block based on a position relationship between the plurality of to-be-tracked points and a position relationship between the plurality of reference points, the plurality of to-be-tracked points comprising upper left corner and lower right corner points of the to-be-tracked image block, and the plurality of reference points comprising upper left corner and lower right corner points of the plurality of reference image blocks, by:

calculating a midpoint of a bottom edge of the to-be-tracked image block based on the upper left corner and lower right corner points of the to-be-tracked image block, to obtain a to-be-tracked midpoint, calculating center points of the plurality of reference image blocks based on the upper left corner and lower right corner points of the plurality of reference image blocks, to obtain a plurality of reference center points, mapping the to-be-tracked midpoint to the reference image according to a preset coordinate axis transformation formula, to obtain a mapped midpoint, and constructing the point transformation relationship between the mapped midpoint and the plurality of reference center points; and obtaining a position of a reference point in the reference image corresponding to a to-be-tracked point in the to-be-tracked image based on the point transformation relationship, to determine an object in the reference image corresponding to the at least one object.

12. The non-transitory computer readable storage medium according to claim 11, wherein, when the computer readable instructions are configured to cause the processor to perform constructing the point transformation relationship between the to-be-tracked image block and the reference image block based on the position relationship between the plurality of to-be-tracked points and the position relationship between the plurality of reference points, the computer readable instructions are configured to cause the processor to perform:

mapping the plurality of to-be-tracked points to the reference image according to a preset coordinate axis transformation formula, to obtain a plurality of mapped points; and constructing the point transformation relationship between the plurality of mapped points and the plurality of reference points.

13. The non-transitory computer readable storage medium according to claim 12, wherein, when the computer readable instructions are configured to cause the processor to perform constructing the point transformation relationship between the plurality of mapped points and the plurality of reference points, the computer readable instructions are configured to cause the processor to perform:

for each mapped point in the plurality of mapped points:
calculating matching scores between the each mapped point and the plurality of reference points to obtain a matching score set; and constructing the point transformation relationship between the plurality of to-be-tracked points and the plurality of reference points according to the matching score set.

14. The non-transitory computer readable storage medium according to claim 13, wherein, before the computer readable instructions are configured to cause the processor to perform extracting the to-be-tracked image block from the to-be-tracked image and extracting the reference image block from the reference image, the computer readable instructions are configured to cause the processor to perform:

marking coordinate points in each of the to-be-tracked image and the reference image; and constructing the preset coordinate axis transformation formula between the to-be-tracked image and the reference image according to a correspondence between the coordinate points of the to-be-tracked image and the coordinate points of the reference image.

\* \* \* \* \*